US006640093B1

(12) United States Patent
Wildhagen

(10) Patent No.: US 6,640,093 B1
(45) Date of Patent: Oct. 28, 2003

(54) BROADCAST RECEIVER

(75) Inventor: Jens Wildhagen, Weinstadt (DE)

(73) Assignee: Sony International (Europe) GmbH, Berlin (DE)

( * ) Notice: Subject to any disclaimer, the term of this patent is extended or adjusted under 35 U.S.C. 154(b) by 313 days.

(21) Appl. No.: 09/605,966

(22) Filed: Jun. 28, 2000

(30) Foreign Application Priority Data

Jun. 29, 1909 (EP) ............................................. 99112405

(51) Int. Cl.[7] .................................................. H04B 1/00
(52) U.S. Cl. ................. 455/130; 455/164.1; 455/178.1; 455/219; 455/220; 455/227; 375/316; 375/344; 375/346; 375/354; 348/725; 348/726
(58) Field of Search .............................. 455/130–150.1, 455/164–168, 178–191, 219, 227–253; 375/316–351, 354–376; 348/726

(56) References Cited

U.S. PATENT DOCUMENTS

| | | | | |
|---|---|---|---|---|
| 4,646,150 A | * | 2/1987 | Robbins et al. | ............. 348/485 |
| 4,885,802 A | * | 12/1989 | Ragan | ...................... 455/182.2 |
| 5,029,237 A | * | 7/1991 | Ragan | ...................... 455/182.2 |
| 5,031,233 A | * | 7/1991 | Ragan | ........................ 340/7.38 |
| 5,666,170 A | | 9/1997 | Stewart | |
| 6,075,829 A | * | 6/2000 | Hayashi et al. | ............. 329/304 |
| 6,192,089 B1 | * | 2/2001 | Corleto et al. | ............... 375/316 |
| 6,208,695 B1 | * | 3/2001 | Klank et al. | ................. 375/260 |
| 6,317,589 B1 | * | 11/2001 | Nash | .......................... 375/345 |

FOREIGN PATENT DOCUMENTS

| | | | |
|---|---|---|---|
| EP | 0 486 095 | 5/1992 | |
| EP | 0 486 095 A1 | 5/1992 | |
| NL | 00486095 A1 | * 7/1991 | ............ H03D/3/00 |

OTHER PUBLICATIONS

"The CORDIC Trigonometric Computing Technique," Jack E. Volder, IRE Transactions on Electronic Computers, vol. EC–8, Sep. 1959, No. 3.

\* cited by examiner

*Primary Examiner*—William Trost
*Assistant Examiner*—Stephen D'Agosta
(74) *Attorney, Agent, or Firm*—Frommer Lawrence & Haug LLP; William S. Frommer; Bruno Polito

(57) ABSTRACT

A receiver for broadcast signals, e.g. DAB, FM, DVB, and digital or analog short-wave RF broadcast signals according to the present invention includes a polyfunctional circuit (5) that can be switched into three modes and performs the digital frequency demodulation which is needed for the reception of a frequency modulated signal in a first mode A, a digital frequency adjustment of the receiver in case of the reception of a digital or analog modulated broadcast signal like DAB, DVB, DRM or AM in a second mode B and the digital frequency adjustment and the digital gain control of the receiver which is needed in case of the reception of a digitally modulated broadcast signal like DAB, DVB, DRM in a third mode C. Depending on the needed functionality not all of these modes need to be realized. Nevertheless, the same hardware will be used for different purposes although the circuit is realized with an optimized amount of hardware to realize an efficient receiver.

18 Claims, 17 Drawing Sheets

| afc-fine-amplification factor | agc[3] | agc[4] | agc[5] | agc[6] | agc[7] | agc[8] |
|---|---|---|---|---|---|---|
| *1.5 | 1 | 1 | + | + | 1 | 1 |
| *1.25 | 1 | 1 | + | + | 2 | 2 |
| *1.0 | 0 | 0 | + | + | 0 | 0 |
| *0.875 | 1 | 1 | - | - | 3 | 3 |

FIGURE 17

| State | IQ_IN | S1 | S2 | S3 | S4 | S5 | S6 | S7 | S8 | S9 | S10 | S11 | S12 | S13 | S14 | S15 | S16 | S17 | S18 | S19 | LE1 | LE2 | LE3 | LE4 | A1 | A2 | A3 | Sh1 | Sh2 | ROM |
|---|---|---|---|---|---|---|---|---|---|---|---|---|---|---|---|---|---|---|---|---|---|---|---|---|---|---|---|---|---|---|
| 0 | [g(I), fg(I)] | dc | dc | dc | dc | dc | dc | dc | dc | dc | dc | dc | dc | dc | dc | dc | dc | dc | dc | dc | 0 | 0 | dc | 0 | dc | + | + | 4 | 4 | dc |
| 1 | dc | dc | dc | dc | dc | dc | dc | dc | dc | 0 | 0 | 0 | 0 | 0 | 0 | 0 | dc | 1 | 1 | 1 | 0 | 0 | dc | 0 | dc | + | + | 4 | 4 | dc |
| 2 | dc | dc | dc | dc | dc | dc | 1 | dc | dc | 0 | 1 | 1 | 0 | 1 | 0 | 0 | dc | 0 | 0 | 1 | 0 | 0 | dc | 0 | dc | + | + | 3 | 3 | dc |
| 3 | dc | dc | dc | dc | dc | dc | 1 | dc | dc | 1 | 1 | 1 | 0 | 1 | 0 | 0 | dc | 1 | 0 | 1 | 0 | 0 | dc | 0 | dc | + | + | 3 | 3 | dc |
| 4 | dc | dc | dc | dc | dc | dc | 1 | dc | dc | 0 | 1 | 1 | 0 | 0 | 0 | 0 | dc | 0 | 1 | 1 | 0 | 0 | dc | 0 | dc | + | + | 3 | 3 | dc |
| 5 | dc | dc | dc | dc | dc | dc | 1 | dc | dc | 1 | 1 | 1 | 0 | 0 | 0 | 0 | dc | 1 | 1 | 1 | 0 | 0 | dc | 0 | dc | + | + | 3 | 3 | dc |
| 6 | dc | dc | dc | dc | dc | dc | 1 | dc | dc | 1 | 0 | 1 | 0 | 1 | 0 | 0 | dc | 0 | 0 | 1 | 0 | 0 | dc | 0 | dc | + | + | 3 | 3 | dc |
| 7 | dc | dc | dc | dc | dc | dc | 1 | dc | dc | 0 | 0 | 1 | 0 | 0 | 0 | 0 | dc | 1 | 0 | 1 | 0 | 0 | dc | 0 | dc | + | + | 4 | 4 | dc |
| 8 | dc | dc | dc | dc | dc | dc | 1 | dc | dc | 1 | 0 | 1 | 0 | 0 | 0 | 0 | dc | 0 | 1 | 1 | 0 | 0 | dc | 0 | dc | + | + | 4 | 4 | dc |
| 9 | dc | 0 | 1 | 0 | 0 | 0 | 0 | 0 | 0 | 0 | 0 | 0 | 0 | dc | 0 | 0 | 0 | 0 | 0 | 0 | 0 | 0 | dc | 0 | sign(Y) | sign(Y) | -sign(Y) | 0 | 0 | 0.5 |
| 10 | dc | dc | 0 | 0 | 0 | 0 | 0 | 0 | 0 | 0 | 1 | 1 | 0 | dc | 0 | 0 | 0 | 0 | 0 | 0 | 0 | 0 | dc | 0 | sign(Y) | sign(Y) | -sign(Y) | 0 | 0 | 0.25 |
| 11 | [g(I), fg(I)] | dc | dc | dc | dc | dc | dc | dc | dc | 0 | 1 | 1 | 0 | dc | 1 | 1 | 0 | 0 | 0 | 0 | 0 | 0 | dc | 0 | sign(Y) | sign(Y) | -sign(Y) | 1 | 1 | 0.1475830 |
| 12 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 2 | 2 | 0.0779724 |
| 13 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 3 | 3 | 0.0385813 |
| 14 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 4 | 4 | 0.0193669 |
| 15 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 5 | 5 | 0.0099457 |
| 16 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 6 | 6 | 0.0049744 |
| 17 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 7 | 7 | 0.0024872 |
| 18 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 8 | 8 | 0.0012360 |
| 19 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 9 | 9 | 0.0006256 |
| 20 | dc | dc | dc | dc | dc | dc | dc | dc | dc | 0 | 1 | 1 | dc | dc | 1 | 1 | 0 | 0 | 0 | 0 | 0 | 0 | dc | 0 | sign(Y) | sign(Y) | -sign(Y) | 10 | 10 | 0.0003052 |
| 21 | dc | dc | dc | dc | 0 | dc | 0 | dc | dc | 1 | 1 | 1 | dc | dc | 1 | 0 | 0 | 0 | 0 | 0 | 0 | 0 | dc | 0 | , | sign(Y) | -sign(Y) | 11 | 11 | 0.0001526 |
| 22 | dc | dc | dc | dc | dc | dc | dc | dc | dc | dc | dc | dc | dc | dc | dc | dc | dc | dc | dc | dc | 1 | 1 | 1 | 1 | dc | dc | dc | dc | dc | dc |
| 23 | dc | dc | dc | dc | dc | dc | dc | dc | dc | dc | dc | dc | dc | dc | dc | dc | dc | dc | dc | dc | 0 | 0 | 0 | 0 | dc | dc | dc | dc | dc | dc |

FIGURE 18

BROADCAST RECEIVER

FIELD OF INVENTION

The present invention relates to a receiver for broadcast signals, e.g. DAB, FM, DVB, and digital or analog short-wave RF broadcast signals, e.g. DRM or AM signals, in particular to receivers for digitally modulated signals and/or multi-transmission system receivers for at least two different broadcast signals.

BACKGROUND OF INVENTION

State of the art multi-transmission system receivers that can be switched between different RF broadcast signals usually comprise separate processing blocks each of which is directly related to a specific type of RF broadcast signal in-between the input stages of a RF receiver, like antenna, front-end block, A/D converter and IQ generator, and the output stage, like D/A converter. Such individual circuits respectively perform e.g. the digital frequency demodulation which is needed for the reception of a frequency modulated signal, the digital frequency adjustment of the receiver in case of reception of AM or short-wave broadcast signals and the digital frequency adjustment and digital gain control of the receiver in case of DAB reception. In these solutions, the AFC (Automatic Frequency Control) and the AGC (Automatic Gain Control) as well as the digital filtering of a complex baseband signal, the sampling rate decimation and the frequency demodulation are separate blocks which leads to high realization costs.

BRIEF SUMMARY OF INVENTION

Therefore, it is the object underlying the present invention to provide a receiver for broadcast signals that has lower realization costs than comparable state of the art receivers.

According to the present invention this object is solved with a receiver according to independent claim 1. Preferred embodiments thereof are defined in dependent claims 2 to 19.

According to the present invention an efficient realization of a receiver uses a polyfunctional circuit that receives the complex baseband signal generated from a respective RF broadcast signal which can be switched into different modes dependent on the broadcast signals that should be receivable. In a first mode (mode A) the polyfunctional circuit performs the digital frequency demodulation which is needed for the reception of a frequency modulated (FM) signal. According to a preferred embodiment (mode A-1) additionally a digital neighbor channel suppression and sampling rate decimation is performed by the polyfunctional circuit. In a second mode (mode B) the polyfunctional circuit performs the digital frequency adjustment (AFC= automatic frequency control) of the receiver which can be used for the reception of digitally or analog modulated signals, like DAB, DVB, digital short-wave (DRM) or AM reception. In a third mode (mode C) the polyfunctional circuit performs the digital frequency adjustment and the digital gain control (AGC=automatic gain control) of the receiver which is needed in case of DRM, DAB or DVB reception. The polyfunctional circuit has at least the functionality to perform either mode C, or mode C and mode A and/or mode B, or mode A and mode B.

According to the present invention the digital AGC and the digital AFC are realized in one circuit so that the same hardware of the AFC can also be used for the AGC. Furtheron, the digital filtering of complex signals and a sampling rate decimation are included in the polyfunctional circuit to perform a linear phase neighbor channel suppression and noise shaping. Therefore, no additional adders or multipliers are needed for the digital filtering and sampling rate decimation. Since all functionalities needed according to the prior art are combined in one polyfunctional circuit that can be switched into different modes according to the present invention, hardware parts that have to be used for reception of all or several of the RF broadcast signals, i.e. that are not used in parallel, but only during reception of one kind of broadcast signal are shared so that basically the same elements do not have to be included twice within the receiver, but only once.

In a preferred embodiment the circuit combines all three modes for the reception of a digital signal like DAB, DRM or DVB and the reception of analog signals like FM or AM. Furtheron, this polyfunctional circuit can be realized with only three adders and without multipliers which is a quite big advantage in comparison with state of the art multi-transmission system receivers.

The circuit according to the present invention is based and works with the CORDIC-algorithm. The CORDIC-algorithm was published by Jack E. Volder, "The CORDIC Trigonometric Computing Technique", Institute of Radio Engineers, IRE Transactions on Electronic Computers, Vol. EC-8, pp. 330–334, 1959. To get a better understanding of the functionality of the polyfunctional circuit according to the present invention, in the following a short overview of the CORDIC-algorithm is given.

The CORDIC-algorithm is an iterative algorithm to rotate a complex vector. The algorithm can be realized very simple in hardware, because only shift and add operations are needed.

The CORDIC-algorithm rotates a complex input vector $$z(k) = x(k) + jy(k) \qquad (1)$$
$$= x^{(0)}(k) + jy^{(0)}(k)$$
$$= z^{(0)}(k)$$

in a first iteration:

$$x^{(1)}(k) = \sigma^{(0)}(k) \cdot y^{(0)}(k)$$
$$y^{(1)}(k) = -\sigma^{(0)}(k) \cdot x^{(0)}(k) \qquad (2)$$

with $\sigma^{(i)}(k) = \pm 1$: micro rotation direction.

Beginning from the second to the $N^{th}$ iteration, another formula is used $$x^{(i+1)}(k) = x^{(i)}(k) + \sigma^{(i)}(k) \cdot \delta^{(i)} \cdot y^{(i)}(k)$$
$$y^{(i+1)}(k) = y^{(i)}(k) - \sigma^{(i)}(k) \cdot \delta^{(i)} \cdot x^{(i)}(k) \qquad (3)$$

with $\delta^{(i)} = 2^{1-i}$: step with of the $i^{th}$ iteration.

The factor $\delta^{(i)} = 2^{1-i}$ can be realized simply by a shift operation.

The CORDIC-algorithm output signal after the $N^{th}$ iteration $w(k) = z^{(N)}(k)$ is described by the following formula:

$$w(k) = z^{(N)}(k) = z^{(0)}(k) \cdot e^{-j \sum_{i=0}^{N-1} \sigma^{(i)}(k) \cdot \varphi_{rot}^{(i)}} \cdot \prod_{i=1}^{N-1} \sqrt{1 + (\delta^{(i)})^2} \qquad (4)$$

-continued $$= z^{(0)}(k) \cdot K \cdot e^{-j \sum_{i=0}^{N-1} \sigma^{(i)}(k) \cdot \varphi_{rot}^{(i)}}$$

By splitting this formula into amplitude and phase follows:

$$|w(k)| = |z^{(N)}(k)| = |z^{(0)}(k)| \cdot \prod_{i=1}^{N-1} \sqrt{1 + (\delta^{(i)})^2} = K \cdot |z^{(0)}(k)| \quad (5)$$

with $$\varphi_{rot}^{(i)} = \begin{cases} \dfrac{\pi}{2} & \text{for } i = 0 \\ \arctan(\delta^{(i)}) & i > 0 \end{cases}:$$

micro rotation angle of the $i^{th}$ iteration step and $\phi(z^{(0)}(k))$ angle of the input vector $z^{(0)}(k)$.

The rotating angles $\phi_{rot}^{(i)}$ are constant and can therefore be written in a ROM.

The amplitude is amplified by a constant factor $$K = \prod_{i=1}^{N-1} \sqrt{1 + (\delta^{(i)})^2},$$

which is independent on the rotation itself.

The CORDIC-algorithm can be switched between two modes: rotation mode and vector mode.

In rotation mode, the micro rotation direction $\sigma^{(i)}$ is generated from the phase error $\phi_{error}^{(i)}$ $$\varphi_{error}^{(0)}(k) = \varphi(k) \quad (6)$$

$$\varphi_{error}^{(i+1)}(k) = \varphi(k) + \sum_{l=0}^{i} \sigma^{(l)}(k) \cdot \varphi_{rot}^{(l)}$$

by the following formula:

$$\sigma^{(i)}(k) = -\text{sign}(\phi_{error}^{(i)}(k)) \quad (7)$$

The following example describes the CORDIC-algorithm in rotation mode: Lets suppose for the example, the input vector is $$z_{(0)}(k) = e^{j\frac{\pi}{3}}$$

and the rotation phase is $$\varphi(k) = \frac{2\pi}{3} \equiv 120$$

degrees. The CORDIC-algorithm has N=7 iteration steps. The following table shows the phase error $\phi_{error}^{(i)}$ after each iteration in degrees:

| iteration i | $\phi_{\text{error}(i)}$ (k) [degrees] | $\phi_{\text{rot}}^{(i)}$ (k) [degrees] | $\sigma^{(i)}$ (k) |
|---|---|---|---|
| 0 | 120 | 90 | −1 |
| 1 | 30 | 45 | −1 |
| 2 | −15 | 26.56 | 1 |

-continued

| iteration i | $\phi_{\text{error}(i)}$ (k) [degrees] | $\phi_{\text{rot}}^{(i)}$ (k) [degrees] | $\sigma^{(i)}$ (k) |
|---|---|---|---|
| 3 | 11.56 | 14.04 | −1 |
| 4 | −2.48 | 7.13 | 1 |
| 5 | 4.65 | 3.58 | −1 |
| 6 | 1.07 | 1.79 | −1 |
|   | −0.72 |  |  |

FIG. 12 shows the vector $z^{(i)}$ after each iteration. The input vector $$z_{(0)}(k) = e^{j\frac{\pi}{3}}$$

is shown by a small circle. The large circle with the amplitude 1 is only for orientation purpose.

In rotation mode the algorithm rotates the input vector $z^{(0)}(k)$ by a phase value $$\sum_{i=0}^{N-1} \sigma^{(i)}(k) \cdot \varphi_{rot}^{(i)}.$$

With increasing number of iterations N the factor $\phi_{error}^{(N)}(k)$ can be neglected and therefore with $$\varphi_{error}^{(N)}(k) = \varphi(k) + \sum_{i=0}^{N-1} \sigma^{(i)}(k) \cdot \varphi_{rot}^{(i)} \approx 0 \quad (8)$$

follows $$\varphi(k) \approx \sum_{i=0}^{N-1} \sigma^{(i)}(k) \cdot \varphi_{rot}^{(i)}. \quad (9)$$

Together with equation (5)

$$\varphi(z^{(N)}(k)) = \varphi(z^{(0)}(k)) - \sum_{i=0}^{N-1} \sigma^{(i)}(k) \cdot \varphi_{rot}^{(i)} \quad (10)$$

follows:

$$\phi(z^{(N)}(k)) = \phi(z^{(0)}(k)) + \phi(k) \quad (11)$$

and finally with equation (4):

$$w(k) = z^{(N)}(k) = z^{(0)}(k) \cdot K \cdot e^{j\phi(k)} \quad (12)$$

The vector w(k) is generated from the input vector z(k) by an amplification with a constant K and a phase rotation by the phase $\phi(k)$.

In vector mode the angle of each input vector $\phi(z^{(0)}(k))$ is calculated. Therefore the input vector $z^{(0)}$ is rotated to the x-axis and the micro rotation angles $\phi_{rot}^{(i)}$ are added to $\phi(z^{(0)})$. For the rotation of the input vector $z^{(0)}$ to the x-axis, the micro rotation direction $\sigma^{(i)}$ is generated from the imaginary component $y^{(i)}(k)$ using the following formula:

$$\sigma^{(i)} = \text{sign}(y^{(i)}) = \text{sign}(\text{imag}(z^{(i)})) \quad (13)$$

The angle $\phi_{sum}^{(i)}(k)$ of the vector $z^{(i)}$ is calculated using the following equation:

$$\phi_{sum}^{(0)} = 0$$

$$\varphi_{sum}^{(i+1)}(k) = \sum_{i=0}^{i} \sigma^{(i)}(k) \cdot \varphi_{rot}^{(1)} \qquad (14)$$

The following example describes the CORDIC algorithm in rotation mode: Lets suppose for an example, the input vector is again $z^{(0)}(k)=e^{j\pi/3}$ and the CORDIC-algorithm has N=7 iteration steps. The following table shows the phase sum $\phi_{sum}^{(i)}(k)$ in degrees:

| iteration | $\phi_{sum}^{(i)}$ (k) [degrees] | $\phi_{rot}^{(i)}$ (k) [degrees] | σ = sign(imag(y)) |
|---|---|---|---|
| 0 | 0 | 90 | 1 |
| 1 | 90 | 45 | −1 |
| 2 | 45 | 26.56 | 1 |
| 3 | 71.56 | 14.04 | −1 |
| 4 | 57.52 | 7.13 | 1 |
| 5 | 64.65 | 3.58 | −1 |
| 6 | 61.07 | 1.79 | −1 |
|   | 59.28 |   |   |

FIG. 13 shows the vector $z^{(i)}$ after each iteration. The input vector $z^{(0)}(k)=e^{j\pi/3}$ is shown by a small circle. The large circle with the amplitude 1 is only for orientation purpose.

With an increasing number of iterations N the phase $$\varphi_{sum}^{(N)}(k) = \sum_{i=0}^{N-1} \sigma^{(i)}(k) \cdot \varphi_{rot}^{(i)} \qquad (15)$$

of the output vector $z^{(N)}$ is getting neglectable:

$$\varphi_{sum}^{(N)}(k) = \sum_{i=0}^{N-1} \sigma^{(i)}(k) \cdot \varphi_{rot}^{(i)} = \varphi(z^{(N)}(k)) \approx 0 \qquad (16)$$

Together with equation (5)

$$\varphi(z^{(N)}(k)) = \varphi(z^{(0)}(k)) - \sum_{i=0}^{N-1} \sigma^{(i)}(k) \cdot \varphi_{rot}^{(i)} \approx 0 \qquad (17)$$

follows:

$$\varphi(z(k)) = \varphi(z^{(0)}(k)) \approx \sum_{i=0}^{N-1} \sigma^{(i)}(k) \cdot \varphi_{rot}^{(i)} \qquad (18)$$

Furtheron, the digital AFC and the digital frequency demodulation are both state of the art. They are, for example, described in EP 0 486 095 B1 "Digital Receiver". Also the digital filtering of real signals is known, e.g. from EP 0 7412 478 A2 "Circuit for Performing Arithmetic Operations in a Demodulator".

BRIEF DESCRIPTION OF THE DRAWINGS

The present invention and its embodiments will be better understood from the following detailed description thereof taken in conjunction with the accompanying drawings, wherein:

FIG. 14 is a table showing the states of switches, adders/subtracters and shift registers for a mode A of the circuit depicted in FIG. 10, FIG. 15 is a table showing the states of switches, adders/subtracters and shift registers for a mode B of the circuit depicted in FIG. 10, FIG. 16 is a table showing the states of switches, adders/subtracters and shift registers for a mode C of the circuit depicted in FIG. 10, FIG. 17 is a table showing shift and add operations as described in connection with FIGS. 8 and 9, and FIG. 18 is a table showing the states of switches, adders/subtracters and shift registers for a mode A-1 of the circuit depicted in FIG. 11.

DETAILED DESCRIPTION OF INVENTION

Figure 1:
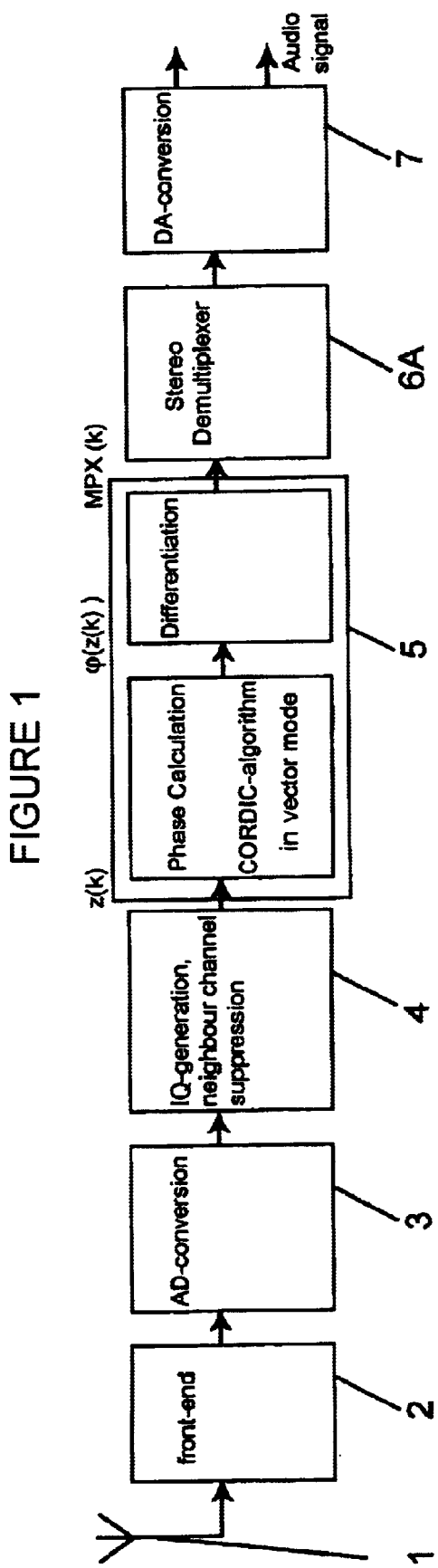
FIG. 1 shows a function block of a receiver according to the present invention that works in mode A, i.e. that performs a frequency demodulation.

FIG. 1 shows the functionality of a receiver according to the present invention for mode A in which the polyfunctional circuit 5 performs a frequency demodulation. A FM broadcast signal is received with an antenna 1 and converted with a front-end block 2, an A/D converter 3 and an IQ generator 4 into a complex baseband signal z(k). This complex baseband signal z(k) might also undergo a neighbor channel suppression within the IQ generator 4 before it is fed to the polyfunctional circuit 5 according to the present invention that performs the digital frequency demodulation and outputs a digital multiplex stereo signal MPX(k) which gets demultiplexed by a stereo demultiplexer 6A before it gets converted into an analog audio signal by a D/A converter 7.

Figure 2:
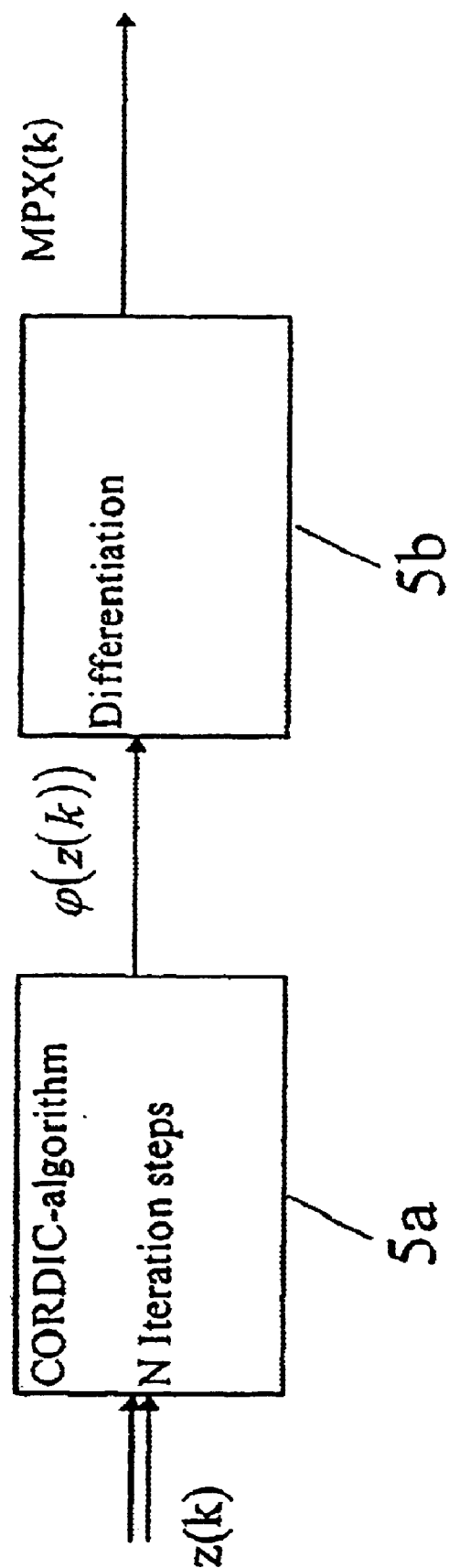
FIG. 2 shows the function blocks of the polyfunctional circuit according to the present invention in the embodiment shown in FIG. 1.

FIG. 2 shows that the frequency demodulation within the polyfunctional circuit 5 is done by a differentiation of the phase of the frequency modulated carrier. Therefore, according to the present invention, the phase value φ(z(k)) for every sample of the complex baseband signal z(k) gets calculated by the CORDIC-algorithm in vector mode with N iteration steps in a phase calculator 5a before the phase value φ(z(k)) differentiated by a differentiator 5b to perform the frequency demodulation. The differentiator then outputs the stereo multiplex signal MPX (k) or STMUX (k), as it is also shown in FIG. 2 which shows the two function blocks of the polyfunctional circuit 5 representative for the FM demodulation.

According to the present invention, the frequency demodulation is done by a differentiation of the phase value φ(z(k)) of the frequency modulated complex baseband signal z(k) using the following approximation:

$$MPX(K) = \frac{d}{dt}\bigg|_{kT} \varphi_z(t) \approx \frac{\varphi(z(k)) - \varphi(z(k-1))}{T} \quad (19)$$

Figure 3:
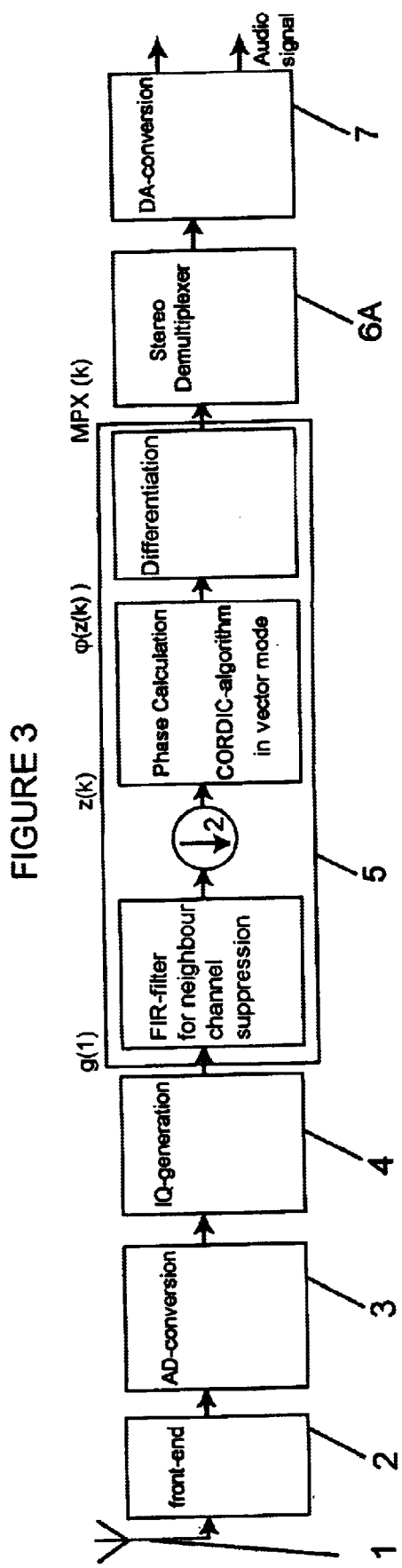
FIG. 3 shows the function blocks of a receiver according to the present invention that works in mode A-1, i.e. that performs a digital linear phase filtering for noise shaping and neighbor channel suppression, sampling rate decimation with a decimation factor of 2 and the digital frequency demodulation.
Figure 4:
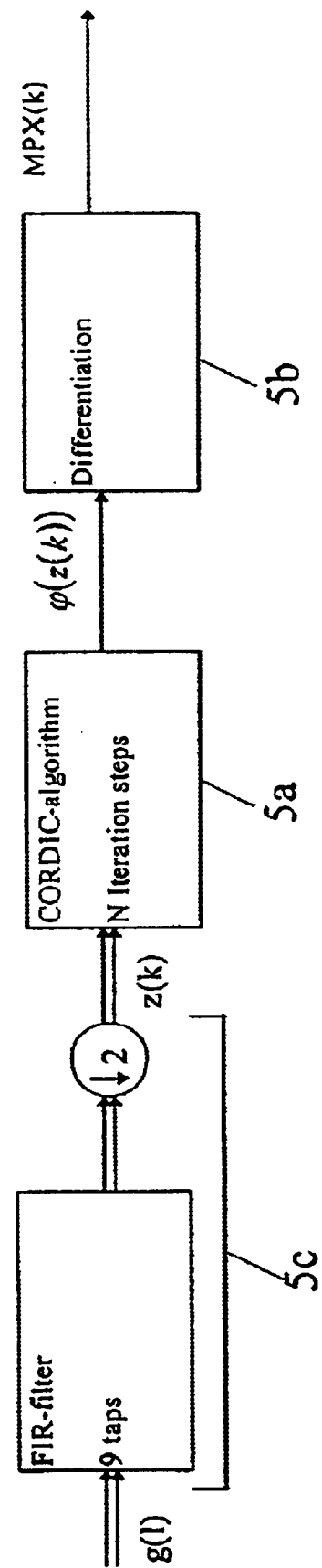
FIG. 4 shows the function blocks of the polyfunctional circuit according to the present invention in the embodiment shown in FIG. 3.

FIG. 3 shows the functionality of a receiver according to the present invention in mode A-1 in which the complex baseband signal does not undergo a neighbor channel suppression within the IQ generator 4, but in which the neighbor channel suppression is formed within the polyfunctional circuit 5. Therefore, as it is shown in FIGS. 3 and 4 that shows the functionality of the polyfunctional circuit 5 shown in FIG. 3, the complex baseband signal generated by the IQ generator 4 is fed to the polyfunctional circuit 5 in which it first passes through a FIR filter and down conversion stage 5c before the signal processing is performed as described in connection with FIGS. 1 and 2. The FIR filter performs the neighbor channel suppression and consists of two real FIR lowpass filters, one for the inphase component and one for the quadrature component of the complex baseband signal. After the filtering with e.g. lowpass filters comprising nine taps a sampling rate decimation with a decimation factor of 2 is performed before the frequency demodulation is again done by a differentiation of the phase of the frequency modulated carrier as it is described above.

Figure 5:
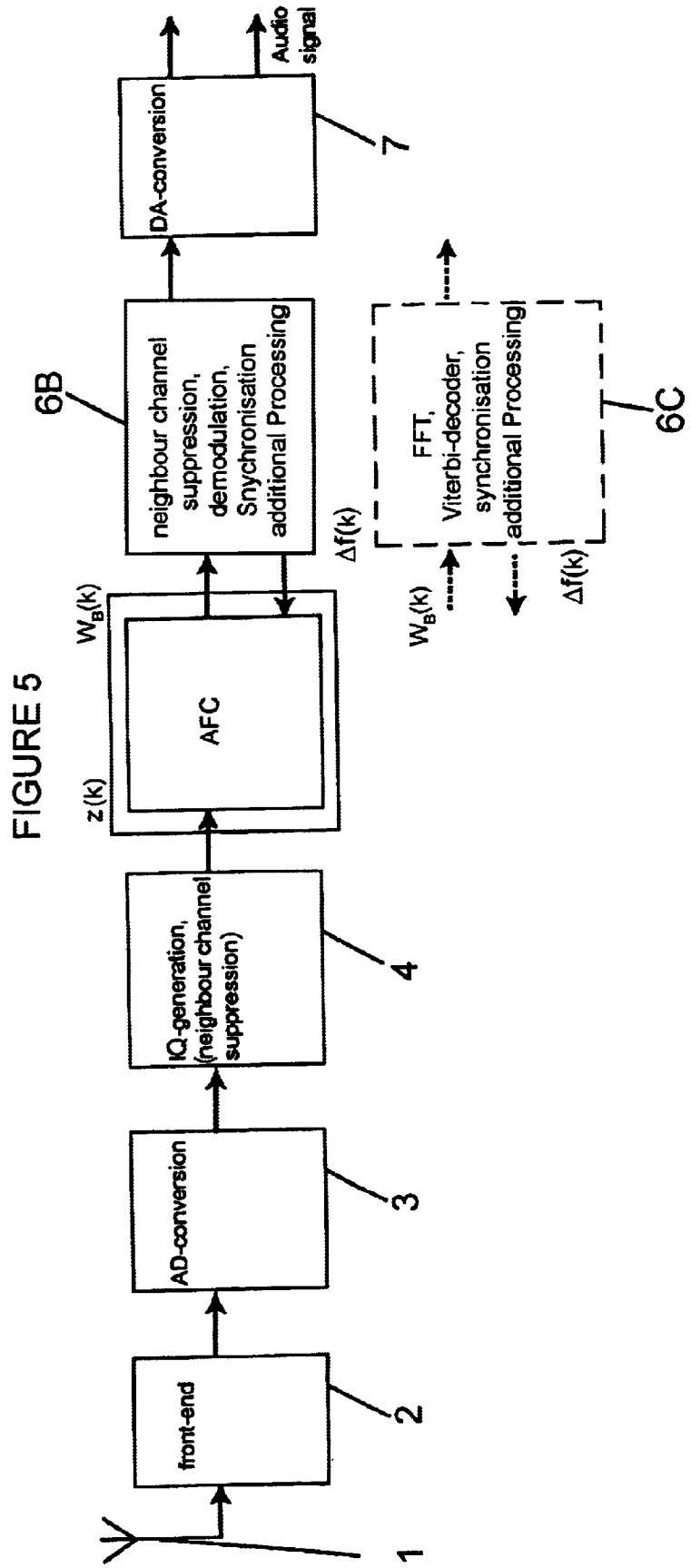
FIG. 5 shows the function blocks of a receiver according to the present invention that works in mode B, i.e. that performs the digital frequency adjustment.
Figure 6:
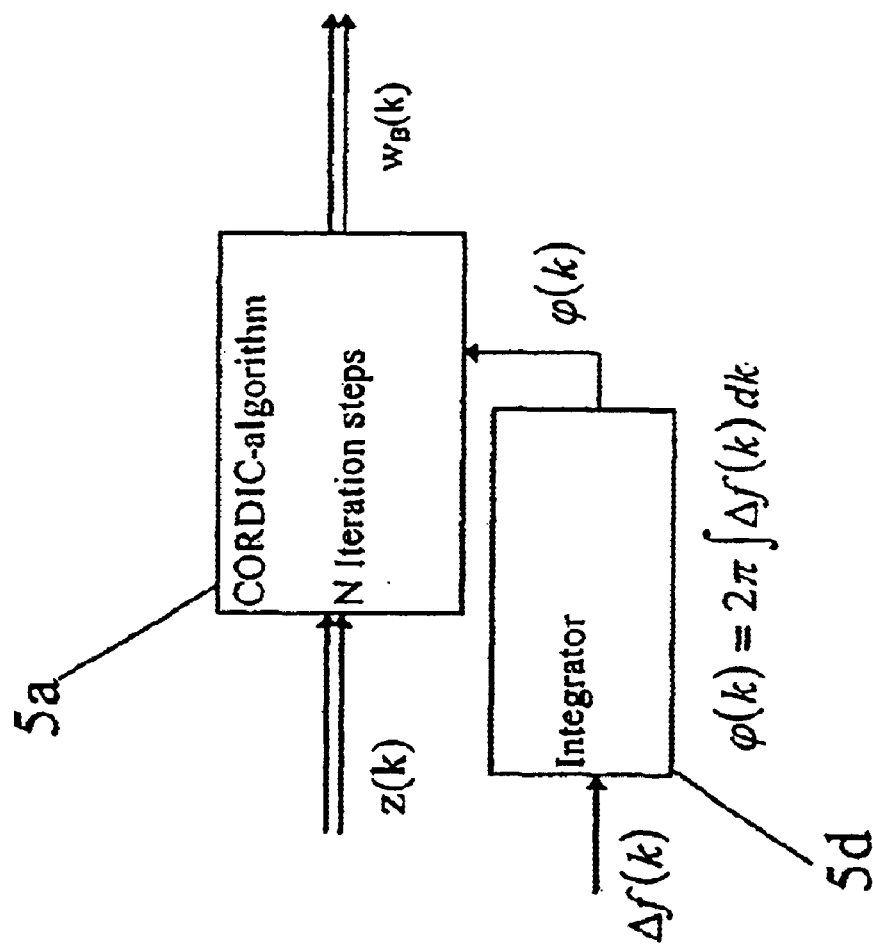
FIG. 6 shows the function blocks of the polyfunctional circuit according to the present invention in the embodiment shown in FIG. 5.

FIG. 5 shows the different functionality of a multi-transmission system receiver according to the present invention in case an AIM, DRM, DAB or DVB, i.e. a digitally or analog modulated broadcast signal is received by the antenna 1 and processed by the front-end block 2, the A/D converter 3 and the IQ generator 4 which again might include a neighbor channel suppression before the so generated complex baseband signal z(k) is fed to the polyfunctional circuit 5 according to the present invention which then feeds its output signal w(k) to a short-wave processing circuit 6B that includes a neighbor channel suppression, a demodulation, an adjustment and additional processings or a DAB processing circuit 6C which includes a FFT, de-interleaving, a Viterbi-decoder, an adjustment, and a MPEG-decoding before the analog audio signal is finally generated by the D/A converter 7. For the automatic frequency control the frequency offset Δf(k) is fed from the short-wave processing circuit 6B or the DAB processing circuit 6C to the polyfunctional circuit 5 according to the present invention. As it is shown in FIG. 5, the polyfunctional circuit 5 performs an automatic frequency control to synchronize the receiver with the transmitter in frequency. The automatic frequency control corrects the frequency offset between the transmitter and the receiver that is calculated by the synchronization algorithm within the short wave processing circuit 6B or the DAB processing circuit 6C FIG. 6 shows the functionality of the polyfunctional circuit 5 performing the automatic frequency correction according to the present invention. The digital baseband signal z(k) is fed to the CORDIC-algorithm block 5a which again comprises N iteration steps and which this time works in rotation mode and rotates every input sample z(k) by a phase value φ(k) which is generated from the frequency offset Δf(k). The phase value φ(k) is calculated from the frequency Δf(k) using the well known formula (21)

$$\varphi(t) = \int_{-\infty}^{t} \Delta\omega(\tau)d\tau = 2\pi \int_{-\infty}^{t} \Delta f(\tau)d\tau \quad (21)$$

Therefore, the frequency offset Δf(k) received from the short-wave processing circuit 6B is fed into an integrator 5d that calculates the phase φ(k) according to the above formula (21) and feeds it to the CORDIC-algorithm block 5a.

In a discrete system this formula can be written as follows:

$$\varphi(k) = T\sum_{l=-\infty}^{k} \Delta\omega(1) = 2\pi T\sum_{l=-\infty}^{k} \Delta f(1) \quad (22)$$

From equation (12)

$$w(k)=z^{(N)}(k)=z^{(0)}(k)\cdot K\cdot e^{j\phi(k)}$$

follows together with equation (22) the following equation (23):

$$z^{(N)}(k) = K \cdot z^{(O)}(k) \cdot e^{jT\sum_{l=-\infty}^{k} \Delta\omega(l)} \quad (23)$$

With Δω(l)=

$$\begin{cases} 0 & \text{for } 1 < 0 \\ \Delta\omega & \text{for } 1 \geq 0 \end{cases}$$

follows:

$$z^{(N)}(k)=K\cdot z^{(0)}(k)\cdot e^{j\Delta\omega\cdot k\cdot T}=K\cdot z^{(0)}(k)\cdot e^{j2\pi\Delta f\cdot k\cdot T} \quad (24)$$

So the input signal of the CORDIC-algorithm is amplified with a constant K and mixed by a multiplication with a complex carrier $e^{j2\pi\Delta f\cdot k\cdot T}$.

Figure 7:
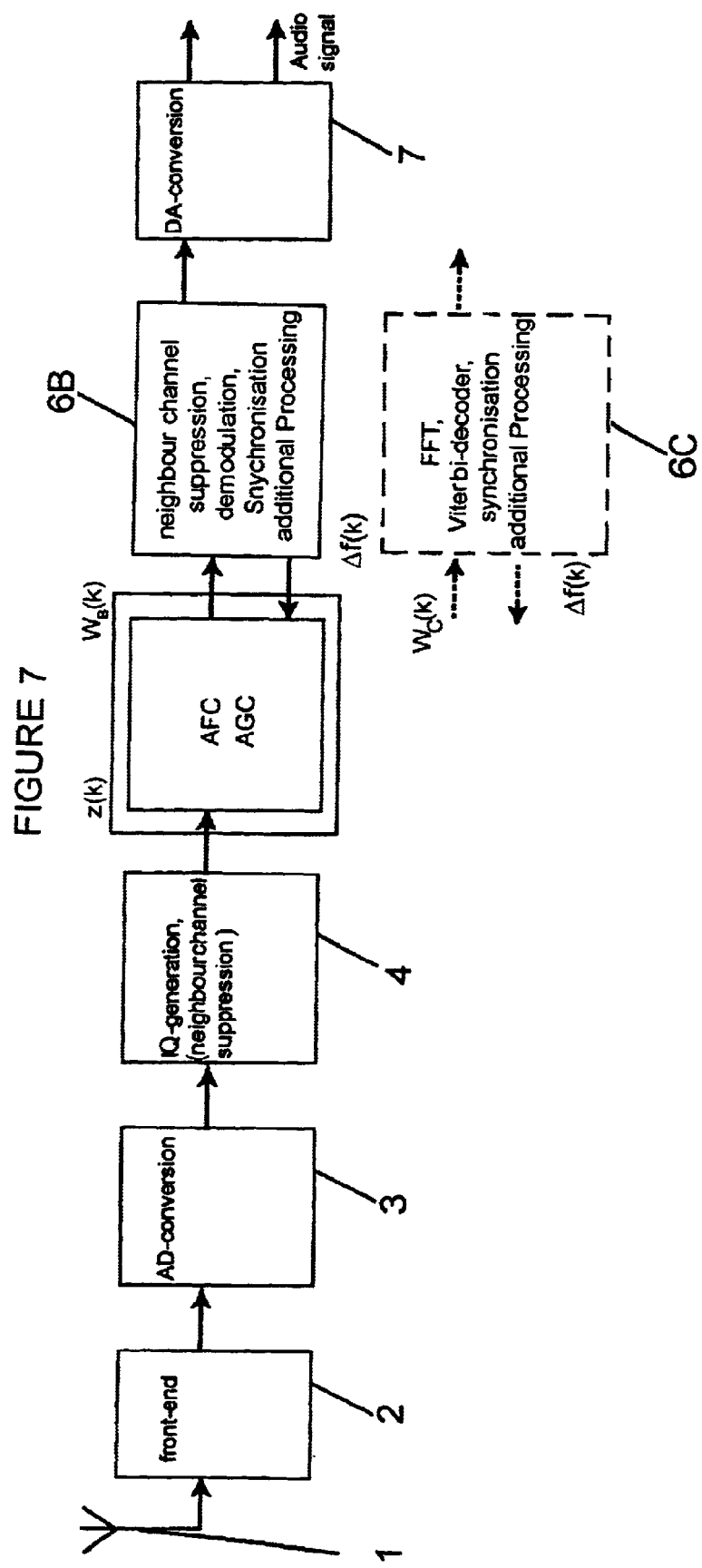
FIG. 7 shows the function blocks of a receiver according to the present invention that works in mode C, i.e. that performs the digital frequency adjustment and the digital gain control of the receiver.

FIG. 7 shows the functionality of a receiver according to the present invention in case of reception of digitally modulated broadcast signals, e.g. of DRM, DAB or DVB reception, in which the circuit performs the digital frequency adjustment and the digital gain control of the receiver after complex baseband signal z(k) has been generated. In this case the polyfunctional circuit 5 passes its output signal to the short-wave processing circuit 6B or the DAB processing circuit 6C. The synchronization again passes the frequency offset Δω(k) to the polyfunctional circuit 5 according to the present invention. The DAB processing circuit 6C sends its output signal to the D/A converter 7 that again produces the analog audio signal.

The AGFC (Automatic Gain and Frequency Control) is needed to again correct the frequency offset between the transmitter and the receiver and to adjust the amplitude of the wanted DAB signal optimal to the following processing, since the neighbor channel suppression of an unwanted DAB neighbor channel can be done in the front-end, in the digital part or a combination of both and the amplitude of the wanted DAB signal has to suite the following processing.

Figure 8:
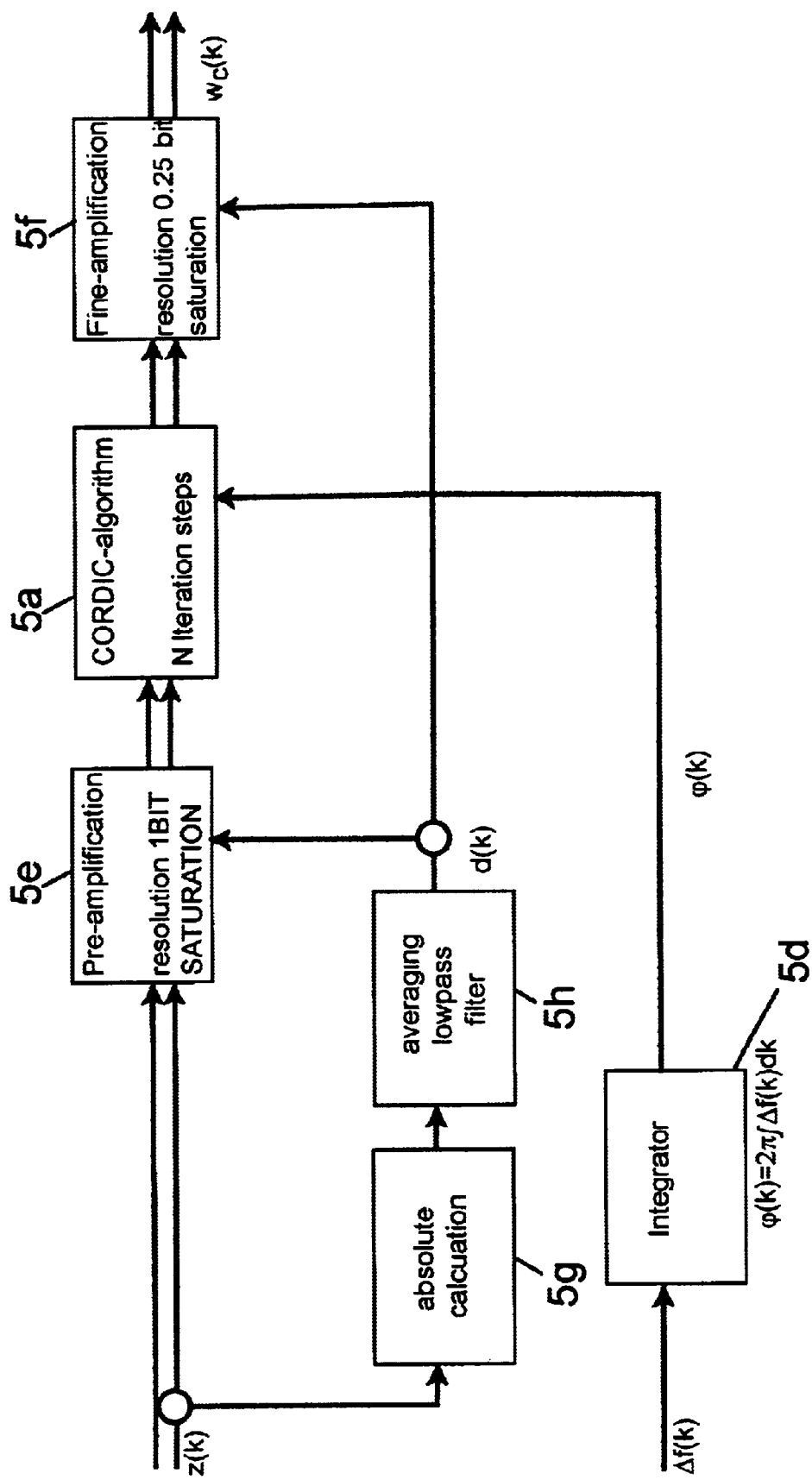
FIG. 8 shows the function blocks of the polyfunctional circuit according to the present invention in the embodiment shown in FIG. 7.

FIG. 8 shows the functionality of the polyfunctional circuit 5 performing the automatic gain and frequency control. The automatic gain control is integrated in the circuit that also performs the automatic frequency control. The automatic gain control uses the shift registers needed to perform the CORDIC-algorithm to adjust the amplitude. The frequency adjustment within the AGFC is performed as described above. Additionally, the average amplitude of the input complex baseband signal z(k) is calculated and an amplification of the input complex baseband signal z(k) depending on the average amplitude thereof is performed to realize the automatic gain control.

The average amplitude is calculated by filtering the absolute of the quadrature component $z_Q(k)$ of the complex baseband signal z(k). Therefore, the absolute value of the quadrature component $z_Q(k)$ is calculated in an absolute calculator 5g which passes its result to an averaging low pass filter 5h that in turn feeds its output signal d(k) to a pre-amplification block 5e with a resolution of 1 bit with included saturation to avoid overflow which is situated in the signal path of the complex baseband signal z(k) in front of the CORDIC-algorithm block 5a and to a fine-amplification block 5f with a resolution of 0.25 bit with included saturation to avoid overflow which is situated in the signal path of the complex baseband signal after the CORDIC-algorithm block 5a.

Figure 9:
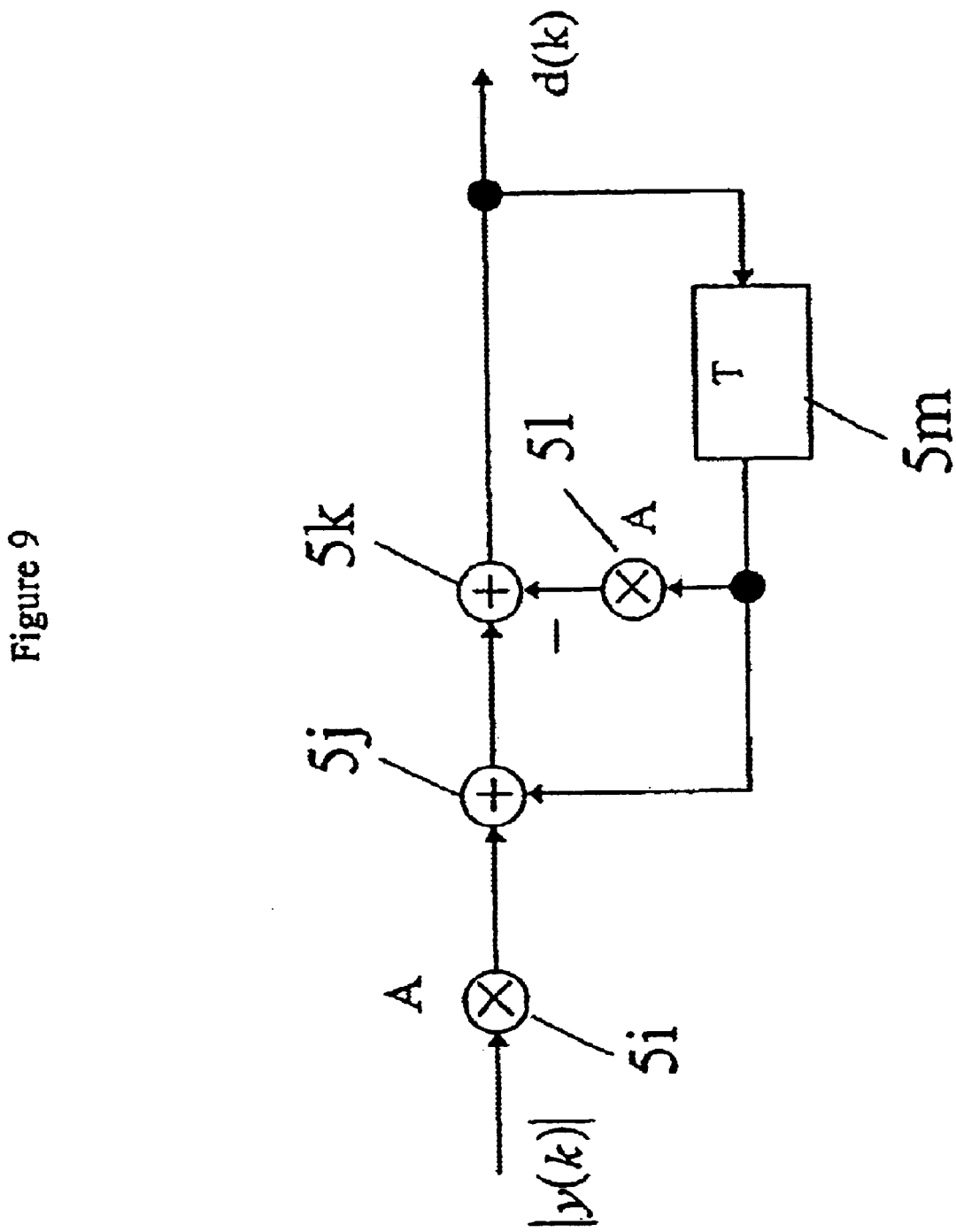
FIG. 9 shows the realization of the averaging low pass filter shown in FIG. 8.

The averaging lowpass filter is shown in FIG. 9. It has the transfer function $$H_{averaging}(z) = \frac{zA}{z - (1 - A)} \quad (25)$$

and the time constant of the averaging low pass filter can be calculated using the following equation:

$$\tau = -\frac{T}{\ln(1 - A)} \quad (26)$$

with T being the sampling rate.

Within the averaging low pass filter the input absolute of the quadrature component $|z_Q(k)|=|y(k)|$ is fed to a first multiplier 5i that is advantageously realized by a shift register and which multiplies this input signal with a constant A before it is fed to an adder 5j which adds the time-delayed output signal d(k) of the averaging low pass filter and which feeds its output signal to a second adder 5k which subtracts the same time-delayed output signal d(k) of the averaging low pass filter which is multiplied by the constant A to produce the output signal d(k). The time-delayed output signal d(k) is generated by a delay circuit 5m that receives the output signal d(k) from the output of the second adder 5k and delays it by a time-constant T. Of course, the average amplitude can also be calculated by filtering the absolute of the inphase component $|z_I(k)|=|x(k)|$.

Figure 10:
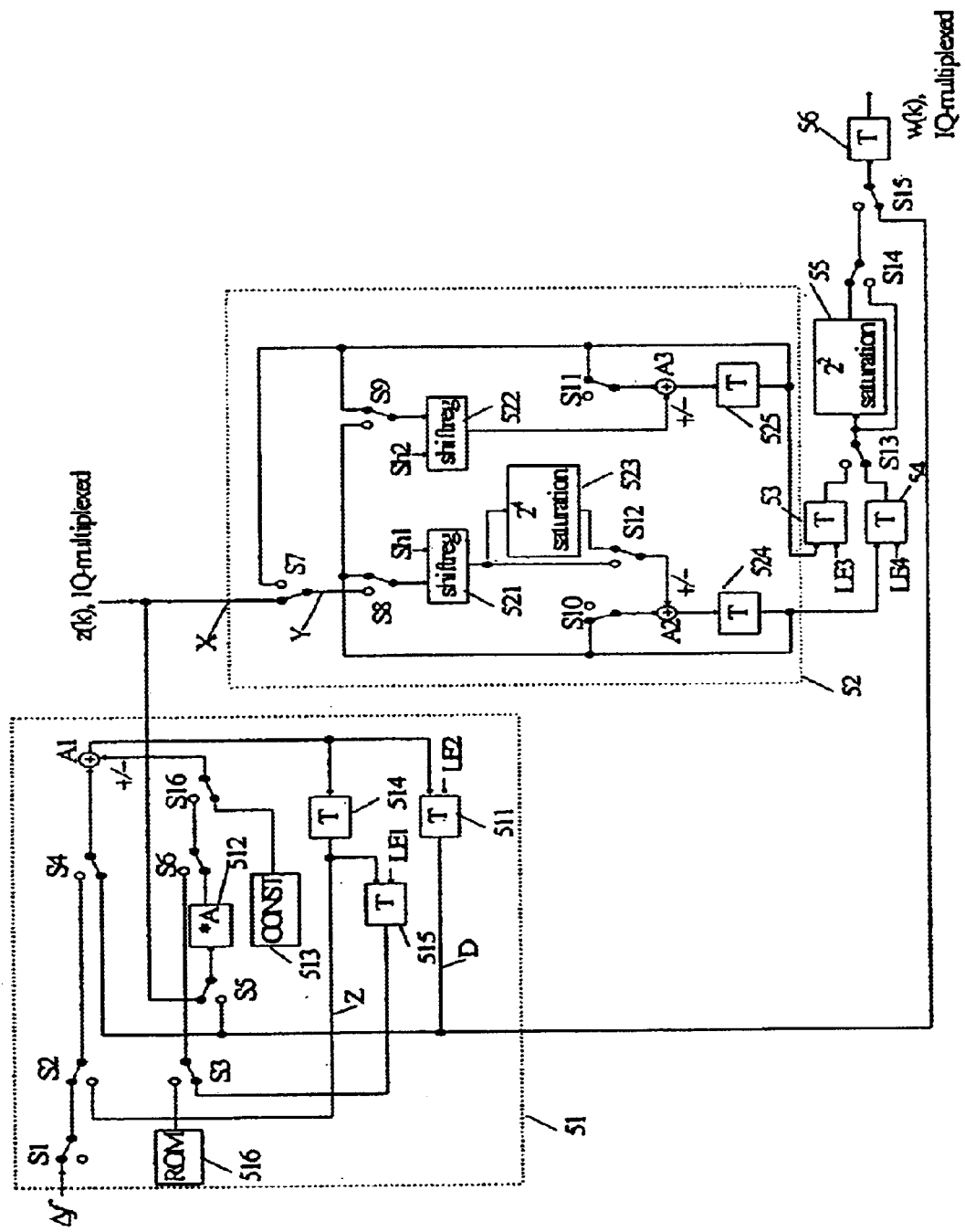
FIG. 10 shows the realization of the polyfunctional circuit according to the present invention that can perform modes A, B and C.

FIG. 10 shows a block diagram of a polyfunctional circuit 5 according to the present invention that is able to perform modes A, B, and C. The polyfunctional circuit 5 consists of a multifunction circuit 51 that receives the IQ multiplexed complex baseband signal z(k) and the frequency offset Δf(k) and outputs one output signal D to an output circuit, a rotation circuit 52 that receives the IQ multiplexed baseband signal z(k) and outputs a first and a second output signal to said output circuit, and said output circuit that receives the output signal D of the multifunction circuit 51 and the first and second output signals of the rotation circuit 52 and outputs the processed IQ multiplexed baseband signal w(k).

The multifunction circuit 51 comprises a first switch S1 that receives the frequency offset Δf(k) at its first input terminal (the first input terminal of a switch is always drawn as a black dot, the second input terminal of a switch is always drawn as a hollow circle and the movable output terminal of a switch is always drawn as a black dot with a line connected to one of the input terminals in the figures, having a second input terminal that runs free and having its movable output terminal connected to a first terminal of a second switch S2 within the multifunction circuit 51. Furtheron, the multifunction circuit 51 comprises a fourth switch S4 having its second terminal connected to the movable output terminal of the second switch S2 and its movable output terminal to a first input of a first adder/subtracter A1. The first input of the first adder/subtracter A1 receives the first summand or diminuend depending on the function which is carried out by the first adder/subtracter A1. Furtheron, the multifunction circuit 51 comprises a third delay circuit 511 having a delay time T that receives the sum or the difference calculated and output by said first adder/subtracter A1 at its first input, a second latch signal LE2 at its second input and which outputs the output signal D of the multifunction circuit 51 at its output. The output signal D is also connected to the first terminal of the fourth switch S4. Furtheron, the multifunction circuit 51 comprises a fifth switch S5 that receives the complex baseband signal z(k) at its first input and the output signal D of said multifunction circuit 51 at its second input. The movable output terminal of said fifth switch S5 is connected to a multiplication circuit 512 also included in said multifunction circuit 51 that multiplies with a constant A, that is advantageously realized by a shift register and which output is connected to the first input of a sixth switch S6 that is also included in said multifunction circuit 51. Still furtheron said multifunction circuit 51 comprises a sixteenth switch S16 having its first input connected to a constant value source 513 which is also included in said multifunction circuit 51 and which represents a constant frequency offset in mode B, its second input connected to the movable output terminal of said sixth switch S6 and its movable output terminal connected to the second input of said first adder/subtracter A1 that receives either the second summand or the subtrahend according to the respective functionality of said first adder/subtracter A1. Further components of said multifunction circuit 51 are a first delay circuit 514, a second delay circuit 515, a third switch 33 and a ROM 516. The first delay circuit 511 has a delay T and has its input connected to the output of said first adder/subtracter A1 and its output connected to the second input of said second switch S2. The second delay circuit 515 also has a delay T and has its first input connected to the output of said first delay circuit 514 and has its second input connected to the first latch signal LE1. The output of the second delay circuit 515 is connected to the first input of said third switch 33 which second input is connected to said ROM 516 and which movable output terminal is connected to the second input of the sixth switch S6.

Said rotation circuit 52 comprises seventh to twelfth switches 37 to S12, a first shift register 521 and a second shift register 522, a second adder/subtracter A2 and a third adder/subtracter A3, and fourth and fifth delay circuits 524 and 525. The seventh switch receives the complex baseband signal z(k) at its first input terminal and has its movable output terminal connected to the second input of the eighth switch S8. The movable output terminal of the eighth switch S8 is connected to the input of the first shift register 521 which has a control input connected to a first shift signal Sh1. The output of the first shift register 521 is connected to the input of a first amplification and saturation block 523 that is also included in said rotation circuit 52 and that performs an amplification by $2^4$ with saturation to avoid overflow and to the second input terminal of the twelfth switch S12. Which first input terminal is connected to the output of the first amplification and saturation block 523.

The movable output terminal of said twelfth switch S12 is connected to the second input of the second adder/subtracter A2 that receives either the second summand or the subtrahend according to the respective functionality of the second adder/subtracter A2. The output of said second adder/subtracter A2 is connected to the input of the fourth delay circuit 524 that has a delay T and which output provides the first output signal of said rotation circuit 52. Said first output signal of said rotation circuit 52 is also connected to the first input of the eighth switch S8, the second input of the ninth switch S9 and the first input of the tenth switch S10. The second input of the tenth switch S10 is running free and the movable output terminal is connected to the first input of said second adder/subtracter A2 that receives the first summand or diminuend according to the functionality of said first adder/subtracter A2. The movable output terminal of the second switch 39 is connected to the input of the second shift register 522 which control input is connected to a second shift signal Sh2. The output of said second shift register 522 is connected to the second input of the third adder/subtracter A3 that is receiving the second summand or the subtrahend according to the respective functionality of said third adder/subtracter A3. The output of said third adder/subtracter A3 is connected to the fifth delay circuit 525 that has a delay T and which output provides the second output signal of said rotation circuit 52. Said second output signal of said rotation circuit 52 is also connected to the second input terminal of said seventh switch S7, the first input terminal of said ninth switch S9 and the first input terminal of the eleventh switch S11. The second input terminal of said eleventh switch S11 is running free and the movable output terminal of said eleventh switch S11 is connected to the first input of said third adder/subtracter A3 that receives the first summand or diminuend according to its functionality.

Said output circuit comprises a sixth delay circuit 53, a seventh delay circuit 54, a second amplification and saturation block 55, an eighth delay circuit 56, and a thirteenth, a fourteenth, and a fifteenth switch S13, S14, and S15. The sixth delay circuit 53 has a delay T and receives the second output signal of the rotation circuit 52 at its first input and a third latch signal LE3 at its second input. The output of the sixth delay circuit 53 is connected to the second input terminal of the thirteenth switch S13 which has its first input terminal connected to the output of the seventh delay circuit 54 but has a delay T and receives the first output signal of the rotation circuit 52 at its first input and a fourth latch signal LE4 at its second input. The movable output terminal of the thirteenth switch S13 is connected to the input of the second amplification and saturation block 55 that calculates an amplification by 22 with saturation to avoid overflow and has its output connected to the first input terminal of the fourteenth switch S14 which has its second input terminal connected to the movable output terminal of the thirteenth switch S13. The movable output terminal of the fourteenth switch S14 is connected to the second input terminal of the fifteenth switch S15. The first input terminal of the fifteenth switch S15 is connected to the output signal D of said multifunction circuit 51. The movable output terminal of said fifteenth switch S15 is connected to the eighth delay circuit 56 that has a delay T and which provides the output signal w(k) of the polyfunctional circuit 5.

Figure 14:
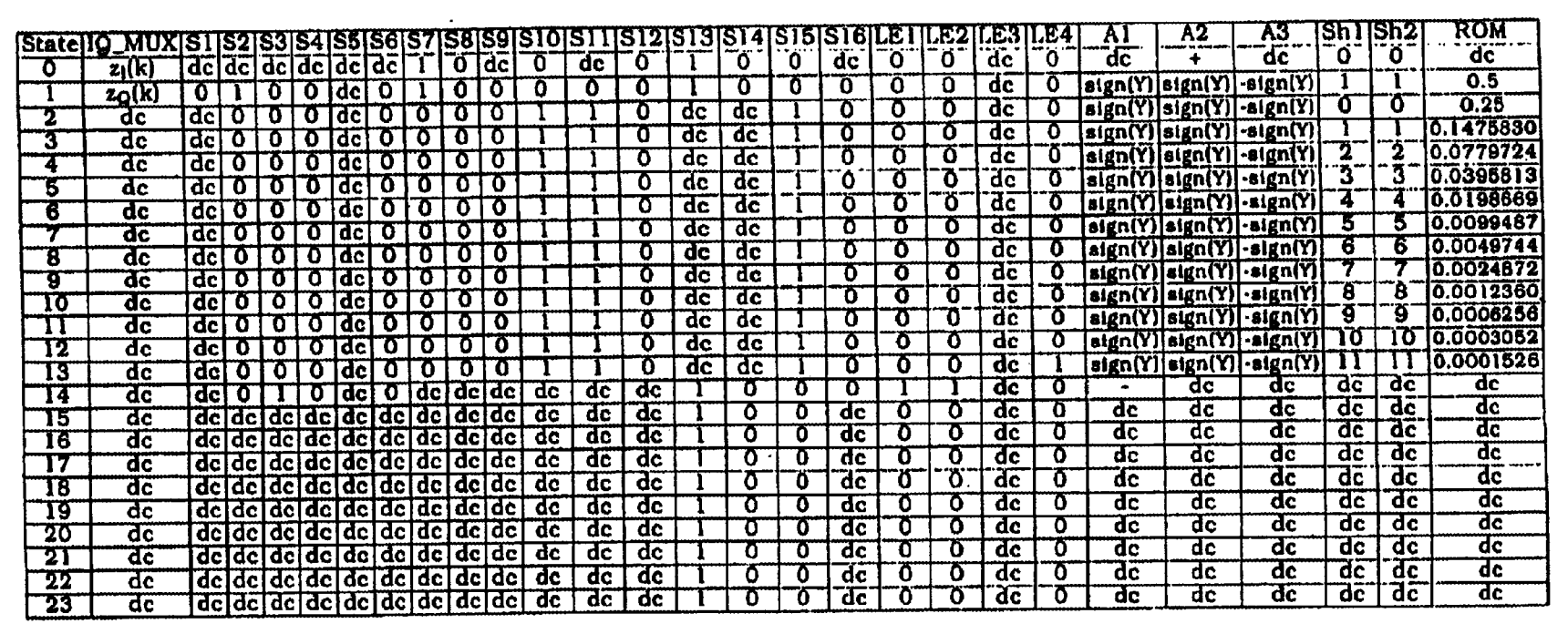

The states of the switches, adders/subtracters and shift registers of the circuit described above and shown in FIG. 10 for mode A are shown in FIG. 14. The circuit has 24 different internal states (0 . . . 23) and is clocked with $f_c = 24 f_s$, i.e. 24 times faster than the clock frequency of the input sampling rate $f_s$ of the polyfunctional circuit 5. In state 0, the rotation circuit reads the inphase component $x^{(o)}(k)$ of the time-multiplexed complex baseband signal z(k). In state 1, the rotation circuit reads the quadrature component $x^{(o)}(k)$ of the time-multiplexed complex baseband signal z(k). Beginning from state 1 to state 12, the rotation circuit performs N=13 CORDIC-rotations of the input signal z(k).

The multifunction circuit 51 performs beginning from state 1 to state 13 the summation of the microrotation angles $\phi_{rot}^{(i)}$ described in equation (14). In state 14 the multifunction circuit 51 performs the frequency demodulation described in equation (19).

Figures 15, 16:
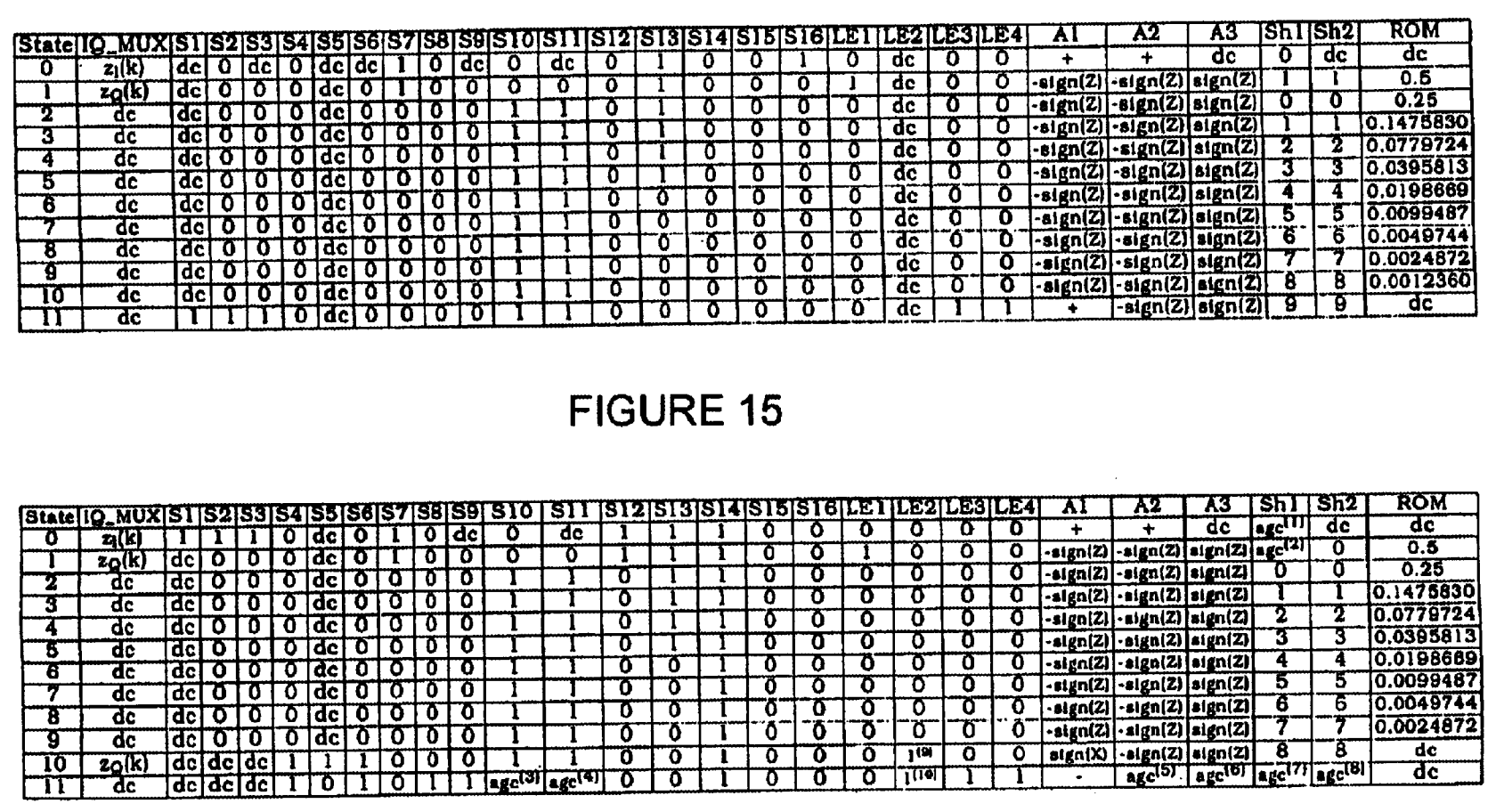

The states of the switches, adders/subtracters and shift registers of the circuit shown in FIG. 10 for mode B, i.e. AM-mode are shown in FIG. 15. The circuit has 12 different internal states (0 . . . 11) and is clocked with $f_c = 12 f_s$, i.e. 12 times the clock frequency of the input sampling rate $f_s$ of the polyfunctional circuit 5. In state 0, the rotation circuit reads the inphase component $x^{(o)}(k)$ of the time-multiplexed complex baseband signal z(k) and in state 1 the quadrature component $y^{(o)}(k)$ of the time-multiplexed complex baseband signal z(k). Beginning from state 1 to state 11, the rotation circuit performs N=11 CORDIC-rotations of the input signal z(k). The multifunction circuit 51 integrates in state 0 the frequency offset Δf(k) as described in equation (22) and beginning from state 1 to state 10 it calculates the phase error $\phi_{error}^{(i)}$ as it is described in equation (6).

FIG. 16 shows the states of the switches adders/subtracters and shift registers of the circuit described above and shown in FIG. 10 for mode C. Again, the circuit has 12 different internal states (0 . . . 11) and is clocked with $f_c = 12 f_s$, i.e. 12 times the clock frequency of the input sample rate $f_s$ of the polyfunctional circuit 5. In state 0, the rotation circuit reads the inphase component $x^{(o)}(k)$ of the time-multiplexed complex baseband signal z(k) and in state 1 the quadrature component $y^{(o)}(k)$ of said time-multiplexed circuit signal. During reading the inphase and quadrature components of the complex baseband signal z(k) the circuit performs a pre-amplification using the first shift register 521 that is controlled by the first shift signal Sh1 and the first amplification and saturation block 523 which performs an amplification with $2^4$. Beginning from state 1 to state 10, the rotation circuit performs N=10 CORDIC-rotations of the input complex baseband signal z(k) and instate 11 the rotation circuit performs a fine-amplification by multiplying the CORDIC output signal with the factors 1.5, 1.25, 1.00, or 0.875. This multiplication is controlled by the average amplitude d(k) as described in connection with FIGS. 8 and 9 and is performed using shift and add operations as shown in FIG. 17.

The multifunction circuit 51 integrates in state 0 the frequency offset Δf(k) as described in equation (22) and beginning from state 1 to state 9 it calculates the phase error $\phi_{error}^{(i)}$ as it is described in equation (6). In states 10 and 11, the multifunction circuit calculates the absolute of the quadrature component y(k) of the input complex baseband signal z(k) and performs the average filtering as described in equation (25).

In FIG. 16 the numbers 1 to 10 in brackets that are shown in connection with some of the arguments in the table have the following meaning:

(3)–(8): depending on the average input amplitude d(k) which is identical to the signal D in mode C, the fine-amplification is performed using FIG. 17.

(1)–(2): Depending on the average input amplitude d(k) that is identical to the signal D in mode C, the rough pre-amplification is performed by varying the value Sh1 of the first shift register 521 in states 0 and 1. Values agc$^{(0)}$ and agc$^{(11)}$ have to be identical during one sample.

(9)–(10): The averaging low pass filter can be enabled and disabled by the signal. In case of a null-symbol of the DAB-frame (9) and (10) can be set to 0 to avoid overshooting of the signal amplitude after the null-symbol.

The amplification has to be held constant during one OFDM-symbol.

Figure 11:
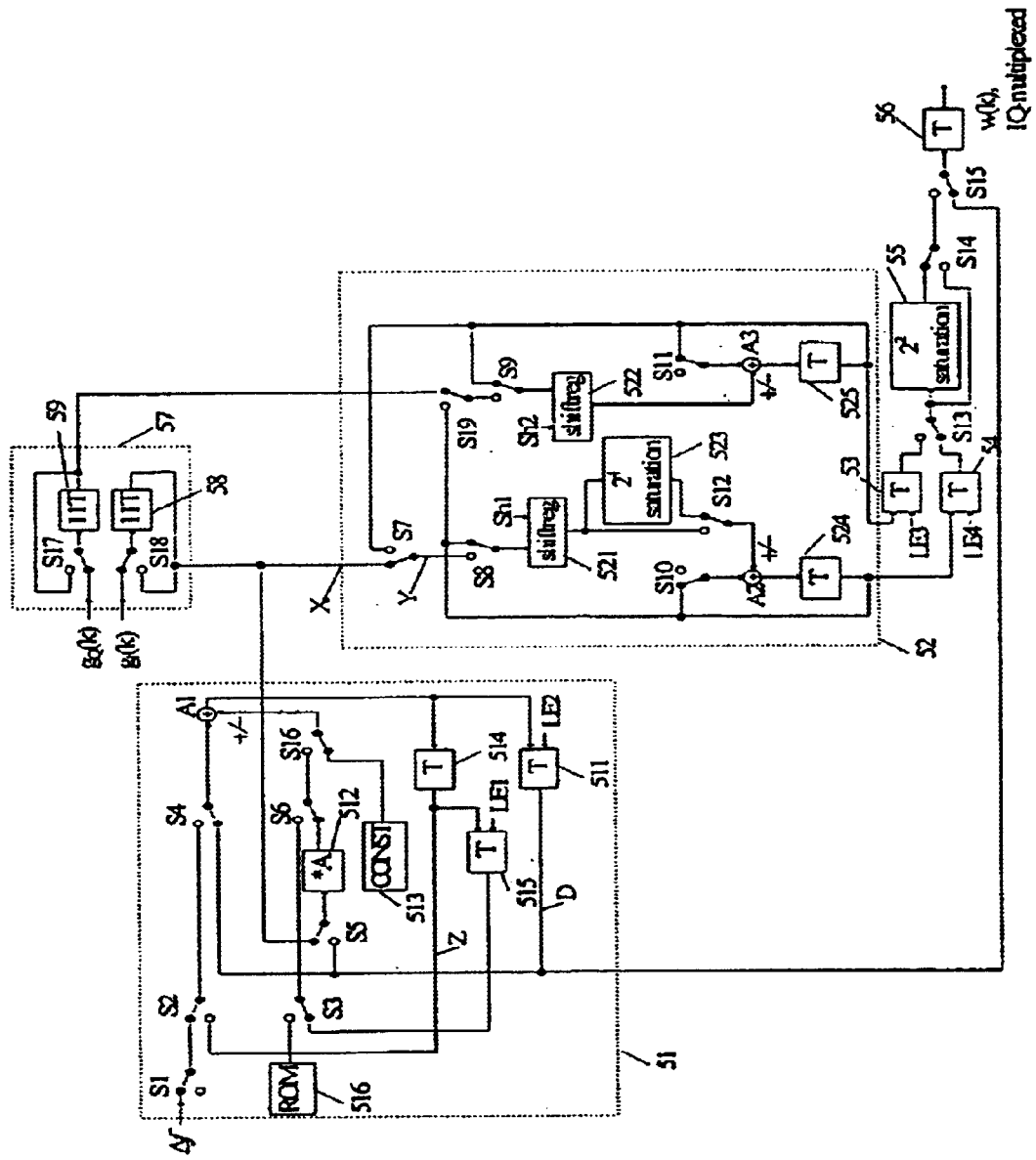
FIG. 11 shows the realization of the polyfunctional circuit according to the present invention to perform modes A-1, B and C.
Figure 12:
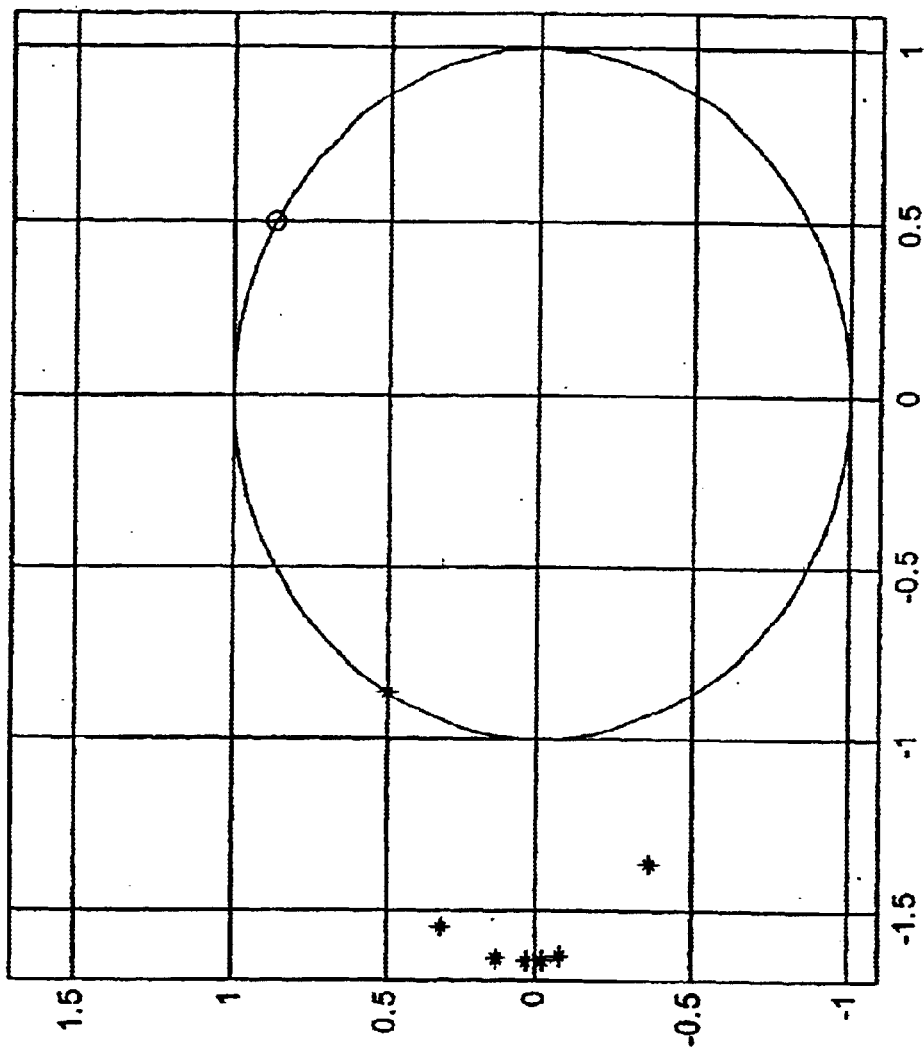
FIG. 12 shows a chart for explaining the rotation mode of the CORDIC-algorithm.
Figure 13:
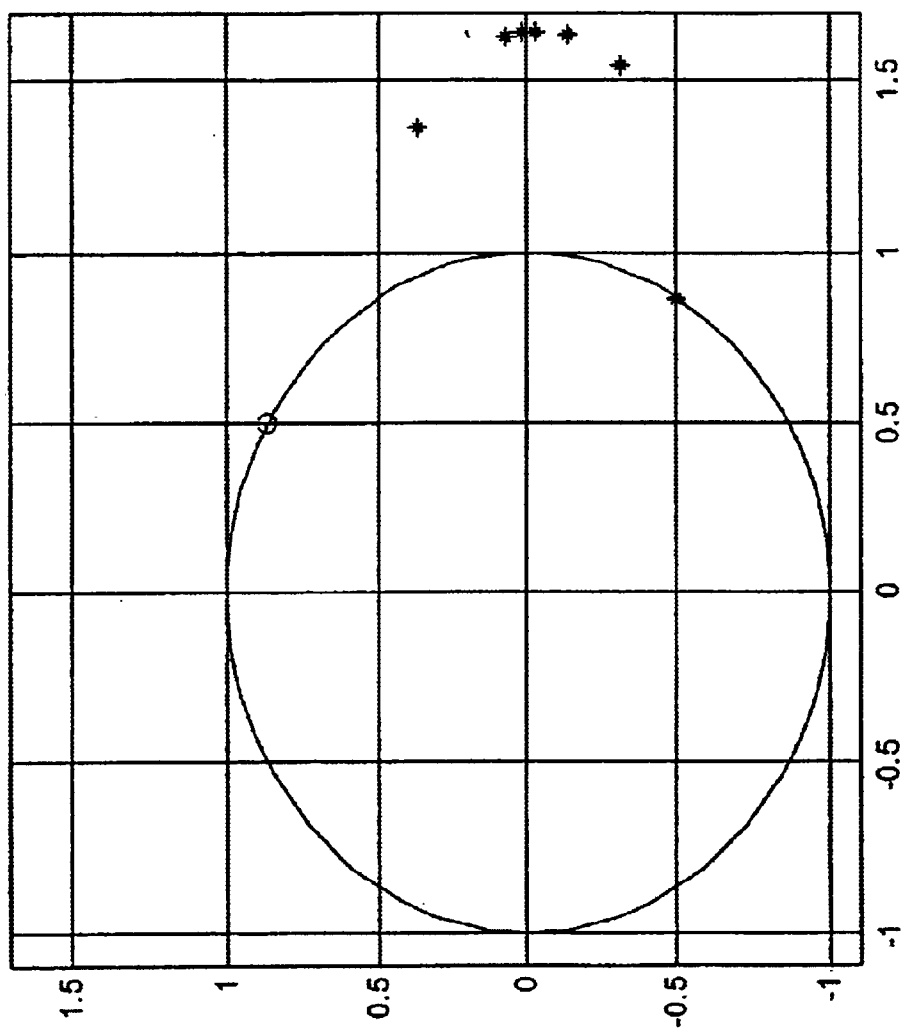
FIG. 13 shows a chart for explaining the vector mode of the CORDIC-algorithm.

FIG. 11 shows a circuit according to the present invention to perform modes A-1, B, and C.

In this case, the polyfunctional circuit 5 additionally comprises a ring buffer circuit 57 that receives the inphase and quadrature components $g_I(1)$ and $g_Q(1)$ of the complex baseband signal g(1) and that leads only one of a quadrature component $g_Q$ and a inphase component $g_I$ to the multifunction circuit 51 and both components $g_Q$ and $g_I$ to the rotation circuit 52. In this case, the inphase component $g_I$ is input to the rotation circuit 52 through the first fixed terminal of the seventh switch S7 as the IQ-multiplexed complex baseband signal z(k) described in connection with the polyfunctional circuit 5 shown in FIG. 10 and the quadrature component $g_Q$ is input to the rotation circuit through the first input terminal of an additional nineteenth switch S19 included in said rotation circuit 52 that is inserted with its path in-between the second input terminal and the movable output terminal in-between the second input terminal of the ninth switch S9 and the first output signal of the rotation circuit 52.

The ring buffer circuit 57 itself comprises a seventeenth switch S17, an eighteenth switch S18, a ninth delay circuit 59, and a tenth delay circuit 58. The first input terminal of the seventeenth switch S17 receives the quadrature component $g_Q(1)$ of the complex baseband signal g(1) and the first input terminal of the eighteenth switch S18 receives the inphase component $g_I(1)$ of the complex baseband signal g(1). The movable output terminal of the seventeenth switch S17 is connected to the ninth delay circuit 59 that has a delay 11T and that provides the quadrature component $g_Q$ at its output to the rotation circuit 52. This output signal of the ninth delay circuit 59 is also connected to the second input terminal of the seventeenth switch S17. The movable output terminal of the eighteenth switch S18 is connected to the input of the tenth delay circuit 58 that has a delay 11T which output provides the inphase component $g_I$ to the multifunction circuit 51 and the rotation circuit 52 and to the second input terminal of the eighteenth switch S18.

FIG. 18 shows the states of the switches, adders/subtracters and shift registers of the polyfunctional circuit 5 shown in FIG. 11 in mode A-1. The polyfunctional circuit 5 shown in FIG. 11 has 24 different internal states (0 . . . 23) and performs a sampling rate decimation with a decimation factor of 2. Therefore, the circuit is clocked with $f_c=12f_{sg}$, $f_{sg}$ is the sampling rate of the circuits input signal g(1).

In states 0 to 8 the rotation circuit performs a 9-tap FIR filtering for complex signals and therefore the rotation circuit gets the needed input samples from the ring buffer circuit 57. Beginning from state 9 to state 21, the rotation circuit performs N=13 CORDIC-rotations of the filtered and sampling rate decimated signal z(k).

The multifunction circuit 51 performs beginning from state 9 to state 21 the summation of the microrotation angles $\phi_{rot}^{(i)}$ as described in equation (14). In state 22 the multifunction circuit 51 performs the frequency demodulation described in equation (19).

As the polyfunctional circuit 5 shown in FIG. 11 is besides the switch S19 and the ring buffer circuit 57 identical to the polyfunctional circuit 5 shown in FIG. 10, the functionalities for modes B and C can easily be derived from the description above in connection with the changes to the circuit.

It is clearly to be understood that the polyfunctional circuits 5 shown in FIGS. 10 and 11 can be modified by those skilled in the art without departing from the scope of the dependent claims and the invention is not limited to these specific circuits.

According to the present invention the shift registers that are quite costly that are included in the rotation circuit 52 are used for different purposes and therefore the receiver according to the present invention is cheaper than such receiver according to the prior art. Furtheron, the circuit is realized with only 3 adders/subtracters and no additional adders or multipliers are needed for the digital filtering in sampling rate decimation and the same hardware is used from the automatic frequency control and the automatic gain control, since the multipliers 512 and 5i are advantageously realized by shift registers.

What is claimed is:

1. Receiver for broadcast signals, characterized by:
a polyfunctional circuit (5) receiving a complex baseband signal (z(k)) generated from a respective RF broadcast signal that is able to perform either mode C, or mode C and mode A and/or mode B, or mode A and mode B of the below defined modes, mode A: frequency demodulation of the complex baseband signal (z(k)) to generate and output a multiplexed digital audio signal (MPX(k)) wherefrom a digital audio signal is generated in case an analog FM broadcast signal should be processed, mode B: digital frequency adjustment of the complex baseband signal (z(k)) to generate and output a frequency corrected complex baseband signal ($w_B$(k)) wherefrom a digital audio or video signal is generated in case a digitally or analog modulated broadcast signal should be processed, mode C: frequency and amplitude adjustment of the complex baseband signal (z(k)) to generate and output a frequency and amplitude corrected complex baseband signal ($w_C$(k)) wherefrom a digital audio or video signal is generated in case a digitally modulated broadcast signal should be processed;

an antenna (1) to receive and output said respective RF broadcast signal;

a front-end block (2) connected to said antenna (1) to downconvert the received RF broadcast signal to output an IF signal;

an A/D converter (3) connected to said front-end block (2) to digitize the IF signal to output a digital IF signal;

an IQ generator (4) connected to said A/D converter (3) to generate and output said complex baseband signal (z(k)) to said polyfunctional circuit (5); and at least one of the following three circuits;

a demultiplexer (6A) receiving said multiplexed digital audio signal (MPX(k)) from said polyfunctional circuit (5) to output said digital audio signal in case a FM signal should be processed;

a short-wave processing circuit (6B) receiving said frequency corrected complex baseband signal ($w_B$(k)) or said frequency and amplitude corrected complex baseband signal ($w_C$(k)) from said polyfunctional circuit (5) to output said digital audio or video signal in case a digitally or analog modulated broadcast signal should be processed; and a DAB processing circuit (6C) receiving said frequency corrected complex baseband signal (wB(k)) or said frequency and amplitude corrected complex baseband signal (wc(k)) from said polyfunctional circuit (5) to output said digital audio signal in case a DAB broadcast signal should be processed; and a D/A converter (7) to receive the digital audio signal and to output an analog audio signal;

whereby a neighbor channel suppression is performed by at least one of said polyfunctional circuit, said short-wave processing circuit and said IQ generator.

2. Receiver according to claim 1, characterized in that said short-wave processing circuit (6B) is performing a neighbor channel suppression, a demodulation, an adjustment and additional processing to generate said digital audio signal;

said DAB processing circuit (6C) is performing a FFT, a de-interleaving, a Viterbi-decoding, an adjustment and a MPEG-decoding to generate said digital audio signal.

3. Receiver according to claim 1, characterized in that said IQ generator (4) is performing a neighbor channel suppression besides the generation of said complex baseband signal (z(k)).

4. Receiver according to claim 1, characterized in that said polyfunctional circuit (5) includes a FIR-filter (5c) to also perform a neighbor channel suppression on said complex baseband signal (z(k), g(1)) in case a FM broadcast signal should be processed.

5. Receiver according to claim 1, characterized in that said polyfunctional circuit (5) includes a CORDIC calculation unit (5a) receiving input samples of said complex baseband signal (z(k))

that is working in vector mode to output a phase of every input sample of the complex baseband signal that is fed into a differentiation unit (5b) that is calculating and outputting said multiplexed digital audio signal (MPX (k)) in case an FM broadcast signal should be processed;

that is working in rotation mode and is additionally receiving a frequency offset ($\Delta f(k)$) via an integrator (5d) to rotate every input sample by a phase value ($\phi(k)$) that corresponds to the integrated frequency offset ($\Delta f(k)$) to output said frequency corrected complex baseband signal ($w_B(k)$, $w_C(k)$) in case a digitally or analog modulated broadcast signal should be processed.

6. Receiver according to claim 5, characterized in that said CORDIC calculation unit (5a) receives every input sample of said complex baseband signal (z(k)) via a pre-amplification unit (5e) and outputs said frequency and amplitude corrected complex baseband signal ($w_C(k)$) via a fine amplification unit (5f) in case a digitally modulated broadcast signal should be processed, said amplification units (5e, 5f) are respectively receiving an input signal (d(k)) that is calculated by a averaging lowpass filtering an absolute value of the received input sample.

7. Receiver according to claim 6, characterized in that said averaging lowpass filtering of an absolute value of the received input sample is performed by calculating an absolute value ($|y(k)|$, $|x(k)|$) of the received input sample with an absolute calculation unit (5g) and filtering the absolute of the quadrature component (y(k)) or the inphase component (x(k)) of the input sample of the complex baseband signal (z(k)) with an averaging lowpass filter (5h) comprising:

a first multiplier (5i) multiplying said absolute value ($|y(k)|$, $|x(k)|$) of the received input sample with a constant (A);

a first adder (5j) connected to said first multiplier (5i) and receiving its multiplication result and an output signal (d(k)) of the averaging lowpass filter (5h) that got time delayed by a delay circuit (5m) having a delay T to add both signals;

a second adder (5k) connected to said first adder (5j) receiving its calculated sum and an output signal (d(k)) of the averaging lowpass filter (5h) that got time delayed by said delay circuit (5m) and multiplied by said constant (A) with a second multiplier (51) to subtract the latter signal from the former signal to calculate said output signal (d(k)) of the averaging lowpass filter (5h).

8. Receiver according to claim 7, characterized in that said first multiplier (5i) is realized by a shift register.

9. Receiver according to claim 1, characterized in that said polyfunctional circuit (5) comprises the following elements in case all functionalities are realized:

a multifunction circuit (51) receiving the frequency offset ($\Delta f(k)$) and the complex baseband signal (z(k)) and outputting one output signal (D) having the functionality to perform;

an integration of a frequency offset ($\Delta f(k)$), a microrotation control and summation, and an averaging of the complex baseband signal (z(k)) in case a frequency and amplitude adjustment should be processed;

a microrotation summation and differentiation in case a frequency demodulation should be processed;

an integration of the frequency offset ($\Delta f(k)$), a microrotation control in case a frequency adjustment should be processed;

a rotation circuit (52) receiving the complex baseband signal (z(k)) and outputting first and second output signals having the functionality to perform the standard CORDIC algorithm;

an amplification of the complex baseband signal (z(k)) controlled by a control signal; and a multiplexing output circuit receiving the output signal (D) of the multifunction circuit (51) and the first and second output signals of the rotation circuit (52) and outputting the multiplexed processed baseband signal ($w_B(k)$, $w_C(k)$) or the multiplexed digital audio signal (MPX(k)).

10. Receiver according to claim 9, characterized in that said polyfunctional circuit (5) comprises additionally a ring buffer circuit (57) receiving the inphase and quadrature components ($g_I(1)$, $g_Q(1)$) of said complex baseband signal (g(1)) that leads one of an inphase component ($g_I$) or a quadrature component ($g_Q$) to the multifunction circuit (51) and the inphase and quadrature components ($g_I$, $g_Q$) to the rotation circuit (52).

11. Receiver according to claim 9, characterized in that said multifunction circuit (51) comprises:

a first switch (S1) receiving the frequency offset ($\Delta f(k)$) at a first input terminal;

a second switch (S2) having a first input terminal connected to a moveable output terminal of the first switch (S1);

a fourth switch (S4) having a second input terminal connected to a moveable output terminal of the second switch (S2);

a first adder/subtracter (A1) having a first input that receives the first summand or diminuend connected to a moveable output terminal of the fourth switch (S4);

a third delay circuit (511) having a delay T that receives the sum or difference calculated by said first adder/subtracter (A1) at a first input, a second latch signal (LE2) at a second input and which output outputs an output signal (D) of said multifunction circuit (51) and is also connected to a first terminal of said fourth switch (S4);

a fifth switch (S5) receiving said complex baseband signal (z(k)) or one of the inphase component ($g_I$) or the quadrature component ($g_Q$) at a first input terminal and having a second input terminal connected to the output of said third delay circuit (511);

a multiplication circuit (512) multiplying with a constant (A) having an input connected to a moveable output terminal of said fifth switch (S5);

a sixth switch (S6) having a first input terminal connected to an output of said multiplication circuit (512);

a sixteenth switch (S16) having a first input terminal connected to a constant value source (513) which represents a constant frequency offset in mode B, a second input terminal connected to a moveable output terminal of said sixth switch (S6) and a moveable output terminal connected to a second input of said first adder/subtracter (A1) that receives the second summand or the subtrahend;

a first delay circuit (514) having a delay T and having an input connected to an output of said first adder/subtracter (A1) and an output connected to a second input terminal of said second switch (S2);

a second delay circuit (515) having a delay T and having a first input connected to an output of said first delay circuit (514) and having a second input connected to a first latch signal (LE1); and a third switch (S3) having a first input terminal connected to the output of said first delay circuit (515), a second input terminal connected to a ROM (516) and an output connected to a second input terminal of said sixth switch (S6).

12. Receiver according to claim 11, characterized in that said multiplication circuit (512) is realized by a shift register.

13. Receiver according to claim 9, characterized in that said rotation circuit (52) comprises:

a seventh switch (S7) receiving the complex baseband signal (z(k)) or the inphase component ($g_I$) at a first input terminal;

an eighth switch (S8) having a second input terminal connected to a moveable output terminal of said seventh switch (S7);

a first shift register (521) having an input connected to a moveable output terminal of said eighth switch (S8) and a control input connected to a first shift signal (Sh1);

a first amplification and saturation block (523) performing an amplification and saturation having an input connected to an output of said first shift register (521);

a twelfth switch (S12) having a first input terminal connected to an output of said first amplification and saturation block (523) and a second input terminal to the output of said first shift register (521);

a second adder/subtracter (A2) having a second input receiving the second summand or the subtrahend connected to a moveable output terminal of said twelfth switch (S12);

a fourth delay circuit (524) having a delay T and having an input connected to an output of said second adder/subtracter (A2) and an output that provides a first output signal of said rotation circuit (52) connected to a first input terminal of said eighth switch (S8);

a tenth switch (S10) that has a first input terminal connected to an output of said fourth delay circuit (524) and a moveable output terminal connected to a first input of said second adder/subtracter (A2) that receives the first summand or diminuend;

a ninth switch (S9) that receives an output of said fourth delay circuit (524) at a second input terminal;

a second shift register (522) having an input connected to a moveable output terminal of said ninth switch (S9) and a control input connected to a second shift signal (Sh2);

a third adder/subtracter (A3) having a second input receiving the second summand or the subtrahend connected to an output of said second shift register (522);

a fifth delay circuit (525) having a delay T and having an input connected to an output of said third adder/subtracter (A3) and an output that provides a second output signal of said rotation circuit (52) connected to a first input terminal of said ninth switch (S9) and to a second input terminal of said seventh switch (S7); and an eleventh switch (S11) that has a first input terminal connected to an output of said fifth delay circuit (525) and a moveable output terminal connected to a first input of said third adder/subtracter (A2) that receives the first summand or diminuend.

14. Receiver according to claim 13, characterized in that said rotation circuit (52) additionally comprises:

a nineteenth switch (S19) that receives the quadrature component ($g_Q$) of the complex baseband signal (g(1)) via said ring buffer circuit (57) at a first input terminal, having a second input terminal connected to the output of said fourth delay circuit (524) and a moveable output terminal connected to the second input terminal of said ninth switch (S9).

15. Receiver according to claim 10, characterized in that said ring buffer circuit (57) comprises:

a seventeenth switch (S17) receiving the quadrature component ($g_Q(1)$) of the complex baseband signal (g(1)) at a first input terminal;

an eighteenth switch (S18) receiving the inphase component ($g_I(1)$) of the complex baseband signal (g(1)) at a first input terminal;

a ninth delay circuit (59) having a delay 11T and having an input connected to a moveable output terminal of said seventeenth switch (S17) and an output providing the quadrature component ($g_Q$) of the complex baseband signal (g(1)) being connected to a second input terminal of said seventeenth switch (S17); and a tenth delay circuit (58) having a delay 11T and having an input connected to a moveable output terminal of said eighteenth switch (S18) and an output providing the inphase component ($g_I$) of the complex baseband signal (g(1)) being connected to a second input terminal of said eighteenth switch (S18).

16. Receiver according to claim 10, characterized in that said output circuit comprises:

a sixth delay circuit (53) having a delay T receiving said second output signal of the rotation circuit (52) at a first input and a third latch signal (LE3) at a second input and having an output connected to a second input terminal of a thirteenth switch (S13);

a seventh delay circuit (54) having a delay T receiving said first output signal of the rotation circuit (52) at a first input and a fourth latch signal (LE4) at a second input and having an output connected to a first input terminal of said thirteenth switch (S13);

a second amplification and saturation block (55) calculating an amplification and saturation having an input connected to a moveable output terminal of said thirteenth switch (S13);

a fourteenth switch (S14) having a first input terminal connected to an output of said second amplification and saturation block (55) and a second input terminal connected to the moveable output terminal of said thirteenth switch (S13);

a fifteenth switch (S15) having a first input terminal connected to the output (D) of said multifunction circuit (51) and a second input terminal connected to a moveable output terminal of said fourteenth switch (S14); and an eighth delay circuit (56) having a delay T and having an input connected to a moveable output terminal of said fifteenth switch (S15) and outputting said output signal ($w_B(k)$, $w_C(k)$, MPX(k)) of said polyfunctional circuit (5).

17. Receiver according to claim 1, characterized in that said analog modulated broadcast signal is an AM signal.

18. Receiver according to claim 1, characterized in that said digitally modulated broadcast signal is a DAB, DVB, or DRM signal.

* * * * *

UNITED STATES PATENT AND TRADEMARK OFFICE
CERTIFICATE OF CORRECTION

PATENT NO. : 6,640,093 B1
DATED : October 28, 2003
INVENTOR(S) : Wildhagen

It is certified that error appears in the above-identified patent and that said Letters Patent is hereby corrected as shown below:

Title page,
Item [30], should read as follows:
-- [30]  Foreign Application Priority Data
June 29, 1999   (GB)   ……………   99112405.8 --

Signed and Sealed this

Sixteenth Day of March, 2004

JON W. DUDAS
*Acting Director of the United States Patent and Trademark Office*